(12) United States Patent
Widegren et al.

(10) Patent No.: US 7,546,376 B2
(45) Date of Patent: Jun. 9, 2009

(54) MEDIA BINDING TO COORDINATE QUALITY OF SERVICE REQUIREMENTS FOR MEDIA FLOWS IN A MULTIMEDIA SESSION WITH IP BEARER RESOURCES

(75) Inventors: Ina B. Widegren, Stockholm (SE); Johnson Oyama, Solna (SE); Brian C. Williams, Victoria (AU); George Foti, Quebec (CA); Sorin Surdila, Quebec (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1485 days.

(21) Appl. No.: 09/985,573

(22) Filed: Nov. 5, 2001

(65) Prior Publication Data

US 2002/0120749 A1  Aug. 29, 2002

Related U.S. Application Data

(60) Provisional application No. 60/324,523, filed on Sep. 26, 2001, provisional application No. 60/275,354, filed on Mar. 13, 2001, provisional application No. 60/273,678, filed on Mar. 6, 2001, provisional application No. 60/269,573, filed on Feb. 16, 2001, provisional application No. 60/269,789, filed on Feb. 16, 2001, provisional application No. 60/269,572, filed on Feb. 16, 2001, provisional application No. 60/267,737, filed on Feb. 9, 2001, provisional application No. 60/260,766, filed on Jan. 10, 2001, provisional application No. 60/260,765, filed on Jan. 10, 2001, provisional application No. 60/248,110, filed on Nov. 13, 2000, provisional application No. 60/246,501, filed on Nov. 6, 2000.

(51) Int. Cl.
*G06F 15/16* (2006.01)

(52) U.S. Cl. .................. 709/232; 709/231; 709/246
(58) Field of Classification Search ................ 709/231, 709/232, 246
See application file for complete search history.

(56) References Cited

U.S. PATENT DOCUMENTS

| | | | | |
|---|---|---|---|---|
| 6,393,014 | B1* | 5/2002 | Daly et al. | 370/352 |
| 6,404,754 | B1* | 6/2002 | Lim | 370/338 |
| 6,614,899 | B1* | 9/2003 | Sollee et al. | 379/218.01 |
| 6,647,001 | B1* | 11/2003 | Bhagavath et al. | 370/331 |
| 6,714,987 | B1* | 3/2004 | Amin et al. | 709/249 |
| 6,721,565 | B1* | 4/2004 | Ejzak et al. | 455/436 |
| 6,728,208 | B1* | 4/2004 | Puuskari | 370/230.1 |
| 6,754,180 | B1* | 6/2004 | Christie | 370/236 |
| 6,765,921 | B1* | 7/2004 | Stacey et al. | 370/401 |
| 6,847,610 | B1* | 1/2005 | Suumaki et al. | 370/230.1 |
| 6,910,074 | B1* | 6/2005 | Amin et al. | 709/227 |
| 6,970,423 | B2* | 11/2005 | Chuah | 370/230 |
| 7,024,688 | B1* | 4/2006 | Faccin et al. | 726/4 |
| 7,068,623 | B1* | 6/2006 | Barany et al. | 370/329 |
| 2002/0034166 | A1* | 3/2002 | Barany et al. | 370/329 |
| 2002/0034935 | A1* | 3/2002 | Bjelland et al. | 455/403 |
| 2002/0036983 | A1* | 3/2002 | Widegren et al. | 370/230.1 |
| 2002/0124100 | A1* | 9/2002 | Adams | 709/232 |
| 2002/0174171 | A1* | 11/2002 | Byrisetty et al. | 709/203 |
| 2002/0184510 | A1 | 12/2002 | Shieh | |
| 2003/0120135 | A1* | 6/2003 | Gopinathan et al. | 600/300 |
| 2004/0095939 | A1* | 5/2004 | Yang | 370/395.52 |

FOREIGN PATENT DOCUMENTS

| | | | |
|---|---|---|---|
| EP | 1 096 742 | | 10/1999 |
| EP | 1096742 | * | 5/2001 |
| WO | WO 01/28160 A2 | | 8/2000 |
| WO | WO 01/28160 A3 | | 8/2000 |

OTHER PUBLICATIONS

Iera A. et al; "Supporting Multimedia with Soft-QOS Guarantee in Wireless Communication Systems"; 1999 IEEE Global Telecommunications Conference; GLOBECOM'99; Seamless Interconnection for Universal Services. Rio De Janeiro, Brazil, Dec. 5-9, 1999; IEEE Global Telecommunications Conference, New York, NY: IEEE, US, vol. 1A, Dec. 5, 1990; pp. 69-73; XP000958250.

Dunlap J. et al; "QoS Management with Dynamic Bearer Selection Schemes"; Computer Networks, Elsevier Science Publishers B./V., Amsterdam, NL, vol. 37, No. 1, Sep. 2001; pp. 45-53, XP004304933.

International Search Report dated May 29, 2002.
http://www.3gpp.org/ftp/tsg_sa/WG2_Arch/TSGS2_14/tdocs/S2-001539, TSG-SA WG2, SA2 Meeting, Sep. 4-8, 2000, Bristol, England, "Optionality of QoS Scenarios".
http://www.3gpp.org/ftp/tsg_sa/WG2_Arch/TSGS2_14/tdocs/S2-001445, 3GPP_TSG_SAWG2 Drafting Meeting on QoS Issues, Bristol, UK, Sep. 4-8, 2000, "IP Specific Elements in PDP Context Activation/Modification".
http://www.3gpp.org/ftp/tsg_sa/WG2_Arch/drafting_meetings/00_06_Sophia/QoS/S2-000936, 3GPP TSG SA WG #13, Berlin, Germany, Jun. 22-26, 2000, "RSVP Usage in UMTS Networks".
http://www.3gpp.org/ftp/tsg_sa/WG2_Arch/drafting_meetings/00_06_Sophia/QoS/S2-001136, TSG-SA Working Group 2 QoS Drafting Session, Sophia Antipolis, France, Jun. 13-14, 2000, "A SIP-based Call Control Model with End-to-End QoS Negotiation".
http://www.3gpp.org/ftp/tsg_sa/WG2_Arch/drafting_meetings/00_06_Sophia/QoS/S2-001146, 3GPP_TSG_SAWG2 Drafting Meeting on QoS Issues, Sophia Antipolis, France, Jun. 13-14, 2000, "UMTS Specific IP QoS Attributes".
http://www.3gpp.org/ftp/tsg_sa/WG2_Arch/drafting_meetings/00_06_Sophia/QoS/S2-001153, 3GPP_TSG_SAWG2 Drafting Meeting on QoS Issues, Sophia Antipolis, France, Jun. 13-14, 2000, "Additional Scenarios for Appendix A and Creation of Appendix D".
http://www.3gpp.org/ftp/tsg_sa/WG2_Arch/drafting_meetings/00_06_Sophia/QoS/S2-001154, 3GPP_TSG_SAWG2 Drafting Meeting on QoS Issues, Sophia Antipolis, France, Jun. 13-14, 2000, "RSVP Usage for End-toEnd QoS in UMTS".
http://www.3gpp.org/ftp/tsg_sa/WG2_Arch/drafting_meetings/00_10_Sophia_Ant/tdocs/S2-001701, 3GPP TSG-SA Working Group 2, R00 ad-hoc Sophia Antipolis, France, Oct. 9-12, 2000, "Requirements for a relationship between CC and (Access IP-connectivity) bearer contol".
http://www.3gpp.org/ftp/tsg_sa/WG2_Arch/drafting_meetings/00_10_Sophia_Ant/tdocs/S2-001704, 3GPP TSG-SA Working Group 2, R00 ad-hoc Sophia Antipolis, France, Oct. 9-12, 2000, "End-to-End QoS Scenarios for IPMM service".
http://www.3gpp.org/ftp/tsg_sa/WG2_Arch/drafting_meetings/00_10_Sophia_Ant/tdocs/S2-001721, TSG-SA Working Group 2, SA2 Drafting Meeting, QoS-CallFlow Joint Session, Sophia Antipolis, France, Oct. 9-12, 2000, "Requirements for QoS Interactions with Call Signaling".
http://www.3gpp.org/ftp/tsg_sa/WG2_Arch/drafting_meetings/00_10_Sophia_Ant/tdocs/S2-001744, 3GPP TSG-SA Working Group 2, R00 ad-hoc Sophia Antipolis, France, Oct. 9-12, 2000, "Requirements for a relationship between CC and (Access IP-connectivity) bearer control".
http://www.3gpp.org/ftp/tsg_sa/WG2_Arch/drafting_meetings/00_10_Sophia_Ant/tdocs/S2-001755, 3GPP TSG-SA Working Group 2, R00 ad-hoc Sophia Antipolis, France, Oct. 9-12, 2000, "Requirements for a relationship between CC and (Access IP-connectivity) bearer control".
http://www.3gpp.org/ftp/tsg_sa/WG2_Arch/drafting_meetings/00_10_Sophia_Ant/tdocs/S2q000014, TSG-SA Working Group 2, QoS Drafting, Sophia Antipolis, France, Oct. 9-12, 2000, "Operator Requirements for End-to-End IP QoS".
http://www.3gpp.org/ftp/tsg_sa/WG2_Arch/TSGS2_13/tdocs/S2-000723, TSG-SA Working Group 2, Stockholm, Sweden, May 9-12, 2000, "Integration of SIP Signaling and Resource Management in 3GPP".
http://www.3gpp.org/ftp/tsg_sa/WG2_Arch/TSGS2_13/tdocs/S2-000724, 3GPP TSG SA WG2, QoS Drafting Meeting, Stockholm, Sweden, May 9-11, 2000, "QoS Control of the IP Bearer Service".
http://www.3gpp.org/ftp/tsg_sa/WG2_Arch/TSGS2_13/tdocs/S2-000726, 3GPP TSG SA WG2, QoS Drafting Session, Stockholm, Sweden, May 9-11, 2000, "QoS Policies in UMTS Release 2000".
http://www.3gpp.org/ftp/tsg_sa/WG2_Arch/TSGS2_13/tdocs/S2-000727, 3GPP TSG SA WG2, QoS Drafting Session, Stockholm, Sweden, May 9-11, 2000, "Interaction between Call Control and QoS Negotiation".
http://www.3gpp.org/ftp/tsg_sa/WG2_Arch/TSGS2_13/tdocs/S2-000735, 3GPP TSG SA WG2, QoS Drafting Meeting, Stockholm, Sweden, May 9-11, 2000, "QoS Control of the IP Bearer Service".
http://www.3gpp.org/ftp/tsg_sa/WG2_Arch/TSGS2_13/tdocs/S2-000737, 3GPP TSG SA WG2, QoS Drafting Meeting, Stockholm, Sweden, May 9-11, 2000, "Policy Issues for Dynamic QoS".
http://www.3gpp.org/ftp/tsg_sa/WG2_Arch/TSGS2_13/tdocs/S2-000920, 3GPP TSG2 #13, Berlin, Germany, May 22-26, 2000, "Introducing the QoS Policy Manager into UMTS QoS Architecture".
http://www.3gpp.org/ftp/tsg_sa/WG2_Arch/TSGS2_13/tdocs/S2-000921, 3GPP TSG SA WG 2, Berlin, Germany, May 22-26, 2000, "Classification of QoS Policies".
http://www.3gpp.org/ftp/tsg_sa/WG2_Arch/TSGS2_13/tdocs/S2-000947, TSG-SA Working Group 2, Berlin, Germany, May 22-26, 2000, "Interface Between GGSN and Policy Control Point".
http://www.3gpp.org/ftp/tsg_sa/WG2_Arch/TSGS2_13/tdocs/S2-000948, TSG-SA Working Group 2, Berlin, Germany, May 22-26, 2000, "Use of RSVP for QoS Management".
http://www.3gpp.org/ftp/tsg_sa/WG2_Arch/TSGS2_13/tdocs/S2-000949, TSG-SA Working Group 2, Berlin, Germany, May 22-26, 2000, "Two Phase Resource Management for EGPRS/UMTS".
PacketCable Dynamic Quality of Service Specification, PKT-SP-DQOS-I01-991201, http://www.packetcable.com/specs/pkt-sp-dqos-I01-991201.pdf.
PacketCable Dynamic Quality of Service Specification, PKT-SP-DQOS-I03-020116, http://www.packetcable.com/specs/pkt-sp-dqos-I03-020116.pdf.
3GPP Contribution S2-000165, Jan 2000, Puerto Vallarta, "Network Initiated Secondary PDP Context activation procedure".
Marshall et al., "Integration of Resource Management and SIP for IP Telephony," SIP Working Group, Internet Draft, Mar. 2000. http://www.ietf.org/internet-drafts/draft-manyfolks-sip-resource-00.txt.
Marshall et al., "Integration of Resource Management and SIP," SIP Working Group, Internet Draft, Jun. 2000. http://www.ietf.org/internet-drafts/draft-manyfolks-sip-resource-01.txt.
Marshall et al., "Integration of Resource Management and SIP," SIP Working Group, Internet Draft, Nov. 2000. http://www.ietf.org/internet-drafts/draft-ietf-sip-manyfolks-resource-00.
Marshall et al., "Integration of Resource Management and SIP," SIP Working Group, Internet Draft, Feb. 2001. http://www.ietf.org/internet-drafts/draft-ietf-sip-manyfolks-resource-01.
http://www.3gpp.org/ftp/tsg_sa/WG2_Arch/TSGS2_15/tdocs/S2-001964, 3GPP TSG SA2, Tokyo, Nov. 13-17, 2000, "Session Setup with Media Authorization".
http://www.3gpp.org/ftp/tsg_sa/WG2_Arch/TSGS2_15/tdocs/S2q000047, TSG-SA WG2, SA2 Meeting, Nov. 13-17, 2000, Makuhari, Japan, "Architecture Requirements for Policy Enforcement and Control".
http://www.3gpp.org/ftp/tsg_sa/WG2_Arch/TSGS2_15/tdocs/S2q000033, TSG-SA WG2, SA2 Meeting, Nov. 13-17, 2000, Makuhari, Japan, "Architecture Requirements for Policy Enforcement and Control".
http://www.3gpp.org/ftp/tsg_sa/WG2_Arch/TSGS2_15/tdocs/S2q000034, TSG-SA WG2, SA2 Meeting, Nov. 13-17, 2000, Makuhari, Japan, "Resource Authorization, Reservation and Bearer Establishment".
http://www.3gpp.org/ftp/tsg_sa/WG2_Arch/TSGS2_15/tdocs/S2-001931, 3GPP TSG-SA Working Group 2, Makuhari, Japan, Nov. 13-17, 2000, "End-to-End QoS Scenarios for IPMM service".
Yavatkar et al., "A Framework for Policy-based Admission Control," Network Working Group, Request for Comments: 2753, http:www.ietf.org/rfc/rfc2753.txt?number=2753, Jan. 2000.
Boyle et al., "The COPS (Common Open Policy Service) Protocol," Network Working Group, Request for Comments: 2748, Jan. 2000.
Sinnreich et al., "Interdomain IP Communications with QoS, Authorization and Usage Reporting," Internet Draft, Mar. 2000, http://www.ietf.org/internet-drafts/draft-sinnreich-interdomain-sip-qos-osp-01.txt.
Vollbrecht et al., "AAA Authorization Framework," Network Working Group, Request for Comments: 2904, Aug. 2000.
Marshall et al., "SIP Extensions for Media Authorization," SIP Working Group, Internet Draft, Mar. 2000, http://www.ietf.org/internet-drafts/draft-dcsgroup-sip-call-auth-01.txt.

Marshall et al., "SIP Extensions for Media Authorization," SIP Working Group, Internet Draft, Nov. 2000, http://www.ietf.org/internet-drafts/draft-ietf.sip-call-auth-00.txt.

Marshall et al., "SIP Extensions for Media Authorization," SIP Working Group, Internet Draft, Feb. 2001, http://www.ietf.org/internet-drafts/draft-ietf-sip-call-auth-01.txt.

Handley et al., "SIP: Session Initiation Protocol," Internet Engineering Task Force, Internet Draft, Nov. 2000, http://www.ietf.org/internet-drafts/draft-ietf-sip-rfc2543bis-02.txt.

Sinnreich et al., "AAA Usage for IP Telephony with QoS," Internet Draft, Jul. 2000, http://www.ietf.org/internet-drafts/draft-sinnreich-aaa-interdomain-sip-qos-osp-00.txt.

Handley et al., "SDP: Session Description Protocol," Network Working Group, Request for Comments: 2327, Apr. 1998.

S2q-000005, 3GPP Technical Specification, 3G TS 23.XXX, V0.0.0, Oct. 9-12, 2000, "3$^{rd}$ Generation Partnership Project; Technical Specification Group Services and System Aspects; End-to-End QoS Concept and Architecture in UMTS (Release 5)."

S2q-000009, 3GPP Technical Specification, 3G TS 23.207, V0.0.1, Oct. 9-12, 2000, "3$^{rd}$ Generation Partnership Project; Technical Specification Group Services and System Aspects; End-to-End QoS Concept and Architecture."

S2q000018, 3GPP Technical Specification, 3G TS 23.207, V0.0.2, Nov. 13-17, 2000, "3$^{rd}$ Generation Partnership Project; Technical Specification Group Services and System Aspects; End-to-End QoS Concept and Architecture."

3GPP Technical Specification, 3G TS 23.207, V1.0.0 , Nov. 2000, "3$^{rd}$ Generation Partnership Project; Technical Specification Group Services and System Aspects; End-to-End QoS Concept and Architecture."

Hamer et al., "Session setup with media authorization," Nov. 2000, http://www.softarmor.com/sipwg/drafts/draft-hamer-sip-session-auth-00.text.

Gibson et al., "Use of SIP for the Reservation of QoS guaranteed Paths," Internet Draft, Oct. 1999, <draft-gibson-sip-qos-resv-00.txt>.

http://www.3gpp.org/ftp/tsg_sa/WG2_Arch/TSGS2_16/tdocs/S2-010013, TSG-SA WG2 SA2 Meeting, Los Angeles, Jan. 22-26, 2001, "Resource Reservation and Authorization with Enhanced UMTS QoS Signaling".

http://www.3gpp.org/ftp/tsg_sa/WG2_Arch/TSGS2_16/tdocs/S2-010014 TSG-SA WG2 SA2 Meeting, Los Angeles, Jan. 22-26, 2001, "Resource Reservation and Authorization with Enhanced UMTS QoS Signaling and RSVP inter-working at GGSN".

http://www.3gpp.org/ftp/tsg_sa/WG2_Arch/TSGS2_16/tdocs/S2-010016 TSG-SA WG2 SA2 Meeting, Los Angeles, Jan. 22-26, 2001, "IP Specific Elements in UMTS Signaling".

http://www.3gpp.org/ftp/tsg_sa/WG2_Arch/TSGS2_16/tdocs/S2-010020, TSG-SA Working Group 2, Los Angeles, Jan. 22-26, 2001, "RSVP translation to PDP context establishment".

http://www.3gpp.org/ftp/tsg_sa/WG2_Arch/TSGS2_16/tdocs/S2-010021, TSG-SA Working Group 2, Los Angeles, Jan. 22-26, 2001, "Policy management using RSVP tokens".

http://www.3gpp.org/ftp/tsg_sa/WG2_Arch/TSGS2_16/tdocs/S2-010022, TSG-SA Working Group 2 Plenary Session #16, Los Angeles, Jan. 22-26, 2001, "The UMTS QoS Policy Framework".

http://www.3gpp.org/ftp/tsg_sa/WG2_Arch/TSGS2_16/tdocs/S2-010023, TSG-SA Working Group 2 Plenary Session #16, Los Angeles, Jan. 22-26, 2001, "QoS Policy Control in UMTS QoS Management".

http://www.3gpp.org/ftp/tsg_sa/WG2_Arch/TSGS2_16/tdocs/S2-010025, TSG-SA Working Group 2 Plenary Session #16, Los Angeles, Jan. 22-26, 2001, "Expansion of 'Authorize QoS Resources' Procedure for UMTS Call Flow Scenarios".

http://www.3gpp.org/ftp/tsg_sa/WG2_Arch/TSGS2_16/tdocs/S2-010033, 3GPP TSG SAWG2 Drafting Meeting on QoS Issues, Los Angeles, Jan. 22-26, 2001, "IP Specific Elements in UMTS Signaling".

http://www.3gpp.org/ftp/tsg_sa/WG2_Arch/TSGS2_16/tdocs/S2-010037, "Binding information for bearer authorization".

http://www.3gpp.org/ftp/tsg_sa/WG2_Arch/TSGS2_17/tdocs/S2-010412, TSG-SA WG2 SA2 Meeting, Gothenburg, Sweden, Feb. 26-Mar. 2, 2001,"Binding Information in PDP Context Activation".

http://www.3gpp.org/ftp/tsg_sa/WG2_Arch/TSGS2_17/tdocs/S2-010420, 3GPP TSG SA WG2, Gothenburg, Sweden, Feb. 26-Mar. 2, 2001, "Binding information for bearer authorization".

http://www.3gpp.org/ftp/tsg_sa/WG2_Arch/TSGS_17/tdocs/S2-010557, 3GPP TSG-SA WG2 Meeting #17, Gothenburg, Sweden, Feb. 26-Mar. 2, 2001, "PDP Context establishment for IP MM service".

U.S. Appl. No. 10/091,047, Hugh H. Shieh, filed Mar. 4, 2002.

Declaration Under 37 CFR 1.132 filed in the U.S. Appl. No. 10/091,047, Hugh H. Shieh, filed Aug. 15, 2006.

\* cited by examiner

*Primary Examiner*—John Follansbee
*Assistant Examiner*—Nghi V Tran
(74) *Attorney, Agent, or Firm*—Nixon & Vanderhye P.C.

(57) ABSTRACT

Using session signaling, a multimedia session with plural media data streams is initiated between the mobile terminal and a remote host coupled to a packet data network. The mobile terminal is coupled to the packet data network and to a multimedia system that provides multimedia session services by way of an access point. A plurality of packet access bearers is established between the mobile terminal and the access point to transport corresponding ones of the media data streams between the mobile terminal and the access points. The media binding information is created for each media data stream. The media binding information associates each media data stream in the session to one of the media packet access bearers and is used to provide session-based control of each of the media packet access bearers. Different example techniques for generating/providing the media information are disclosed.

22 Claims, 22 Drawing Sheets

| TRAFFIC CLASS | CONVERSATIONAL CLASS CONVERSATIONAL RT | STREAMING CLASS STREAMING RT | INTERACTIVE CLASS INTERACTIVE BEST EFFORT | BACKGROUND BACKGROUND BEST EFFORT |
|---|---|---|---|---|
| FUNDAMENTAL CHARACTERISTICS | • PRESERVE TIME RELATION (VARIATION) BETWEEN INFORMATION ENTITIES OF THE STREAM<br>• CONVERSATIONAL PATTERN (STRINGENT AND LOW DELAY) | • PRESERVE TIME RELATION (VARIATION) BETWEEN INFORMATION ENTITIES OF THE STREAM | • REQUEST RESPONSE PATTERN<br>• PRESERVE PAYLOAD CONTENT | • DESTINATION IS NOT EXPECTING THE DATA WITHIN A CERTAIN TIME<br>• PRESERVE PAYLOAD CONTENT |
| EXAMPLE OF THE APPLICATION | – VOICE | – STREAMING VIDEO | – WEB BROWSING | – BACKGROUND DOWNLOAD OF EMAILS |

*Fig. 10*

| TRAFFIC CLASS | CONVERSATIONAL | STREAMING | INTERACTIVE | BACKGROUND |
|---|---|---|---|---|
| MAXIMUM BIT RATE | x | x | x | x |
| GUARANTEED BIT RATE | x | x | | |
| DELIVERY ORDER | x | x | x | x |
| MAXIMUM SDU SIZE | x | x | x | x |
| SDU FORMAT INFO *) | x | x | | |
| SDU LOSS RATIO | x | x | x | x |
| RESIDUAL BIT ERROR RATIO | x | x | x | x |
| DELIVERY OF ERRONEOUS SDUS | x | x | x | x |
| TRANSFER DELAY | x | x | | |
| TRAFFIC HANDLING PRIO | | | x | |
| ALLOCATION/RETENTION PRIORITY | x | x | x | x |
| SOURCE STATISTICS DESCRIPTOR *) | x | x | | |

*) PARAMETER DIFFERS DEPENDING ON IF IT IS A UMTS BS DESCRIPTION OR A RAB SERVICE DESCRIPTION

*Fig. 11*

| | |
|---|---|
| TRAFFIC CLASS | THE TRAFFIC CLASS LABEL CONTAINS A LOT OF INFORMATION ITSELF |
| MAXIMUM BIT RATE | USED FOR DOWNLINK CODE RESERVATION, POLICING AND SHAPING TOWARDS EXTERNAL NETWORKS |
| GUARANTEED BIT RATE | USED FOR ADMISSION CONTROL AND RESOURCE RESERVATION |
| DELIVERY ORDER | USED TO SETTLE WHETHER PDUS HAVE TO BE BUFFERED AND REORDERED IN ORDER TO BE IN SEQUENCE AT THE OUTPUT OF THE SYSTEM |
| MAXIMUM SDU SIZE | USED FOR ADMISSION CONTROL AND POLICING |
| SDU FORMAT INFO *) | RLC CONFIGURATION. IF INFORMATION OF ALL POSSIBLE SDU SIZES IS GIVEN, THEN RLC CAN BE TRANSPARENT (IN CASE NO ARQ IS NEEDED). |
| SDU LOSS RATIO | USED FOR ARQ CONFIGURATION, ERROR DETECTION CONFIGURATION ON L1 (CRC) |
| RESIDUAL BIT ERROR RATIO | CHOICE OF CHANNEL CODING, ERROR DETECTION ON L1 |
| DELIVERY OF ERRONEOUS SDUs | IS THE NW ALLOWED TO DISCARD PACKETS IN CASE OF ERRONEOUS CHECKSUM? |
| TRANSFER DELAY | THE DELAY IS USED TO DETERMINE WHETHER ARQ SHALL/CAN BE USED OR NOT. ALSO USED FOR TRANSPORT FORMAT SETTINGS. |
| TRAFFIC HANDLING PRIORITY | FOR DIFFERENTIATE INTERACTIVE SERVICE CLASS FOR SCHEDULING PURPOSES |
| ALLOCATION/RETENTION PRIORITY | USED FOR ADMISSION CONTROL AND SETTLEMENT IN CASE OF CONGESTION, I.E. WHO TO ADMIT AND WHO TO DISCARD. |
| SOURCE STATISTICS DESCRIPTOR *) | THIS INFORMATION THAT GIVES THE POSSIBILITY TO USE STATISTICS AT ADMISSION CONTROL, E.G. SPEECH AND DTX. |

*) PARAMETER DIFFERS DEPENDING ON IF IT IS A UMTS BS DESCRIPTION OR A RAB SERVICE DESCRIPTION

Fig. 12

| PACKET FILTER ATTRIBUTE | VALID COMBINATION TYPES | | |
|---|---|---|---|
| | I | II | III |
| SOURCE ADDRESS AND SUBNET MASK | X | X | X |
| PROTOCOL NUMBER (IPv4)/NEXT HEADER (IPv6) | X | X | |
| DESTINATION PORT RANGE | X | | |
| SOURCE PORT RANGE | X | | |
| IPSEC SECURITY PARAMETER INDEX | X | X | |
| TOS (IPv4)/TRAFFIC CLASS (IPv6) AND MASK | | X | X |
| FLOW LABEL (IPv6) | | X | X |

Fig. 14

MEDIA BINDING TO COORDINATE QUALITY OF SERVICE REQUIREMENTS FOR MEDIA FLOWS IN A MULTIMEDIA SESSION WITH IP BEARER RESOURCES

CROSS-REFERENCE TO RELATED APPLICATIONS

This application is related to commonly-assigned U.S. patent application Ser. No. 09/768,956, entitled "RSVP Handling in 3G Networks," filed on Jan. 24, 2001; U.S. patent application Ser. No. 09/861,817, entitled "Application Influenced Policy," filed on May. 21, 2001; U.S. patent application Ser. No. 09/985,631, entitled "Method and Apparatus for Coordinating Quality of Service Requirements for Media Flows in a Multimedia Session with IP Bearer Resources," filed Nov. 5, 2001; and U.S. patent application Ser. No. 09/985,633, entitled "Method and Apparatus for Coordinating Charges for Services Provided in a Multimedia Session," filed Nov. 5, 2001, the disclosures of which are incorporated herein by reference.

REFERENCE TO PRIORITY APPLICATIONS

This application claims priority from and incorporates by reference the following commonly-assigned provisional patent applications: 60/275,354 entitled "Enhancement of Authorization Token for RSVP Interworking," filed Mar. 13, 2001; 60/273,678 entitled "SDP Support for QoS Based SIP Sessions," filed Mar. 6, 2001; 60/269,573 entitled "QoS Characteristics for a UMTS Bearer Appropriate for IP Signaling," filed Feb. 16, 2001; 60/269,789 entitled "Architecture for Packet Data Protocol Context Suitable for Signaling," filed Feb. 16, 2001; 60/269,572 entitled "Binding a Signaling Bearer for Use With an IP Multimedia Subsystem," filed Feb. 16, 2001; 60/267,737 entitled "Authorization Token in PDP Context Activation/Modification in Bearer Establishment for SIP Call Setup (Qos)," filed Feb. 9, 2001; 60/260,766 entitled "QoS Pre-Condition Met," filed Jan. 10, 2001; 60/260,765 entitled "IP Specific Elements in PDP Context Activation/Modification," filed Jan. 10, 2001; 60/246,501 entitled "Principle of User Choice," filed Nov. 6, 2000; 60/248,110 entitled "Triggering RSVP Host," filed Nov. 13, 2000; and 60/324,523, entitled "Use of GPRS APN in IMS/Ipv6 Context," filed on Sep. 26, 2001.

FIELD OF THE INVENTION

The present invention generally relates to Internet Protocol (IP) networks, and more specifically, to coordinating Quality of Service (QoS) provisioning mechanisms in IP networks with multimedia applications.

BACKGROUND

IP networks were originally designed to carry "best effort" traffic where the network makes a "best attempt" to deliver a user packet, but does not guarantee that a user packet will arrive at the destination. Because of the market success of IP networks, there is a clear requirement for mechanisms that allow IP networks to support various types of applications. Some of these applications have Quality of Service (QoS) requirements other than "best effort" service. Examples of such applications include various real time applications (IP Telephony, video conferencing), streaming services (audio or video), or high quality data services (browsing with bounded download delays). Recognizing these QoS requirements, the Internet Engineering Task Force (IETF), which is the main standards body for IP networking, standardized a set of protocols and mechanisms that enable IP network operators to build QoS-enabled IP networks.

FIG. 1 depicts a simplified high-level model of an IP network which may be useful in explaining QoS provisioning. As can be appreciated, the model includes two users, but could easily be expanded to include more users without changing the basic functionality of the network. In FIG. 1, User-A 101 may communicate with User-B 102 or with an application server 103. For example, in the case of an IP telephony session, User-A 101 may communicate with User-B 102. Similarly, in the case of streaming services, User-A 101 may communicate with the application server 103, which may be configured as a video server. In either case, User-A 101 accesses an IP backbone network 104 through a local access network 105, such as PSTN (dial-in access), Global System for Mobile Communications (GSM), or Universal Mobile Telecommunications System (UMTS) network. User-B 102 is o similarly connected to the IP network 104 through a local access network 106. It will be appreciated that User-A and User-B need not use the same type of access network. The IP network 104 may consist of a number of IP routers and interconnecting links that together provide connectivity between the IP network's ingress and egress points and thereby make two party communication possible. As far as the users are concerned, the perceived QoS depends on the mechanisms both in the access networks 105, 106 and on the IP backbone network 104. Of particular interest to this invention is the specific case where at least one of the access networks is a UMTS or GSM/GPRS network.

When users access IP based services, they typically use a device that runs an application program that provides the interface for the user to access the particular service. For instance, in FIG. 1, User-A may use a laptop running a conferencing application program to attend an IP network based meeting, where participants of the meeting collaborate using various programs. Such programs are well known in the art.

Various user applications may access network services through an application programming interface (API). An API provides application programmers with a uniform interface to access underlying system resources. For instance, an API may be used to configure a network resource manager to require that a particular IP packet originating from a given application receive a certain treatment from the network, such as a particular QoS. For example, if the IP network is a Differentiated Services IP network, then an application program may request that all of its IP packets receive the "Expedited Forwarding" treatment.

The User (and the API in the user's equipment) may not be aware of the different technologies that various access networks and IP backbone networks employ in order to provide QoS end-to-end, i.e., from User-A all the way to remote User-B. For instance, the application program may use an RSVP/IntServ based API, and the end-to-end embodiment in which he is involved may include a UMTS access network and a non-RSVP enabled IP network. In such cases, some "interworking" mechanisms between such different technologies and protocols are needed to make sure that the QoS is provided end-to-end.

Integrated Services (IntServ) provides a set of well-defined services which enables an application to choose among multiple, controlled levels of delivery service for their data packets. To support this capability, two things are required. First, individual network elements, such as subnets and IP routers, along the path followed by an application's data packets must support mechanisms to control the quality of service delivered to those packets. Second, a way to communicate the application's requirements to network elements along the path and to convey QoS management information between network elements and the application must be provided.

IntServ defines a number of services such as Controlled-Load (defined in IETF RFC 2211) and Guaranteed (defined in IETF RFC 2212). The service definition defines the required characteristics of the network equipment in order to deliver the service. The individual network elements (subnets and IP routers) that support the service must comply with the definitions defined for the service.

The service definition also defines the information that must be provided across the network in order to establish the service. This function may be provided in a number of ways, but it is frequently implemented by the resource reservation setup protocol such as RSVP (defined in IETF RFC 2205). RSVP (Resource reSerVation Protocol) is an IP-level resource reservation setup protocol designed for an IntServ-enabled Internet (defined in IETF RFC 1633, 2205, and 2210). The RSVP protocol is used by a host (e.g., User A's computer) to request specific service from the network for particular application data streams or flows. RSVP is also used by routers to deliver quality-of-service requests to all nodes along the path(s) of the flows and to establish and maintain the state(s) to provide the requested service. RSVP requests generally result in resources being reserved in each node along the data path.

FIG. 2 shows an End-to-End Integrated Service between the hosts. The service is provided using routers and hosts that support the service definition defined for the required service and through signaling of the relevant information between the nodes. Since RSVP is a protocol that is primarily designed to be end-to-end, extra functionality is required in a situation where the RSVP sender would like to use it for resource reservation only in some portion of the end-to-end path. This situation may arise if RSVP is used in an access network and over-provisioning is used in the backbone network. In such situations, an RSVP (Receiver) Proxy is useful.

A Proxy is a network device, such as a router or a switch, that performs one or more functions on behalf of another device. An RSVP Proxy originates the RSVP RESV message in response to an incoming PATH message on behalf of the receiver(s) identified by the PATH message. (RESV and PATH are well known messages used in RSVP.) In other words, the RSVP (Receiver) Proxy acts on behalf of the remote host and thereby facilitates resource reservation between the originating host and the RSVP Proxy without the host needing to be involved in RSVP signaling. This is shown in FIG. 3. The RSVP Proxy may use knowledge of network conditions between the RSVP Proxy and the non-RSVP host.

Differentiated Services (DiffServ) enhancements to the Internet protocol are intended to enable scalable service discrimination in the Internet without the need for per-flow state and signaling at every hop. A variety of services may be built from a small, well-defined set of building blocks which are deployed in network nodes. The services may be either end-to-end or intra-domain; they include both those that can satisfy quantitative performance requirements (e.g., peak bandwidth) and those based on relative performance (e.g., "class" differentiation). Services may be constructed by a combination of setting bits in an IP header field at network boundaries (autonomous system boundaries, internal administrative boundaries, or hosts), using those bits to determine how packets are forwarded by the nodes inside the network, and conditioning the marked packets at network boundaries in accordance with the requirements or rules of each service.

Differentiated Services defines an edge router at the network boundary, and core routers within the network. The edge and core routers have different duties. The edge router must condition the traffic to ensure that it conforms to the service agreement. It also marks the traffic with the appropriate DSCP Differentiated Services Code Point). It then forwards the packet according to the service behavior defined for that DSCP. The service behavior, called the Per Hop Behavior (PHB) may define the prioritization or weighting of that traffic to give it better service than other traffic. The core nodes examine the DSCP and apply the service behavior appropriate for that service. FIG. 4 shows an end-to-end service. The DS edge routers perform the traffic conditioning, while the DS core routers simply apply the PHB.

Services may be constructed by a unique combination of PHB and traffic conditioning. For example, two different services can be created using the same PHB by applying a different traffic condition functioning at the edge routers.

The IntServ architecture provides a means for the delivery of end-to-end QoS to applications over heterogeneous networks. To support this end-to-end model, the IntServ architecture must be supported over a wide variety of different types of network elements. In this context, a network that supports Differentiated Services may be viewed as a network element in the total end-to-end path.

From the perspective of IntServ, DiffServ regions of the network are No treated as virtual links connecting IntServ capable routers or hosts (much as an ethernet LAN can be treated as a virtual link). Within the DiffServ regions of the network, routers implement specific PHBs (aggregate traffic control). The total amount of traffic admitted into the DiffServ region that will receive a certain PHB is controlled by the conditioning at the edge routers. An IntServ service can be provided across a DiffServ domain by applying admission control and traffic conditioning at the edge router to meet the IntServ Service specification, and signaling the RSVP service characteristics of the DiffServ domain to the next RSVPenable router. The information provided in the RSVP signaling should be appropriate for the service across the DiffServ domain. This is shown in FIG. 5. To realize a QoS Service with clearly defined characteristics and functionality, a QoS bearer must be set up from the source to the destination of the service. A bearer is a logical connection between two entities through one or more interfaces, networks, gateways, etc., and usually corresponds to a data stream. A QoS bearer service includes all aspects to enable the provision of a contracted QoS. These aspects are among others the control signaling, user plane transport, and QoS management functionality.

Mobile Radio Access Data Networks, like General Packet Radio Service (GPRS) and Universal Mobile Telecommunication System (UMTS), may form a part of the overall network and will typically be a significant factor in the end-to-end bearer service for customers connected to it. Hence, the bearer service provided over a GPRS/UMTS network must provide the required end-to-end bearer service.

The GPRS/UMTS network includes a set of network elements between the host, referred to as the Mobile Station (MS), and an external packet switching network the user is connecting to like the Internet. These network As elements are shown in FIG. 6. The radio access network (RAN) provides access over the radio interface to/from the MS. The RAN is coupled to a supporting gateway Gateway GPRS Support Node (SGSN) and a Gateway GPRS Support Node (GGSN). The GGSN provides the interworking with external packet-switched networks.

Before a mobile host can send packet data to an external host, the mobile host must "attach" to the GPRS network to make its presence known and to create a packet data protocol (PDP) context to establish a relationship with a GGSN towards the external network that the mobile host is accessing. The PDP attach procedure is carried out between the mobile host and the SGSN to establish a logical link. As a result, a temporary logical link identity is assigned to the mobile host. A PDP context is established between the mobile host and a GGSN selected based on the name of the external network to be reached. One or more application flows (sometimes called "routing contexts") may be established over a single PDP context through negotiations with the GGSN. Again, an application flow corresponds to a stream of data packets distinguishable as being associated with a particular host application. An example application flow is in an electronic mail message from the mobile host to a fixed terminal. Another example application flow is a link to a particular Internet Service Provider (ISP) to download a graphics file from a website. Both of these application flows are associated with the same mobile host and the same PDP context.

User data is transferred transparently between the MS and the external data networks with a method known as encapsulation and tunneling: data packets are equipped with PS-specific protocol information and transferred between the MS and the GGSN.

Quality of Service (QoS) has an extremely important and central role in $3^{rd}$ generation (3G) UMTS mobile networks. QoS is a means for providing end users with satisfying service. QoS also enables efficient use of the spectrum resources. Because the invention will be described in terms of a UMTS QoS architecture, a brief overview of QoS in UMTS is provided. The 3G UMTS QoS architecture is described, including an explanation of the packet data protocol context (PDP context), a traffic flow template (TFT), and the QoS maintenance procedures for activated UMTS bearers. It is expected that the QoS characteristics associated with a radio communication are the most critical in the end-to-end chain. Within UMTS access networks, the radio network resources are managed on a per PDP context level, which corresponds to one or more user flows/data streams and a certain QoS level.

The QoS framework for 3G networks is specified in the 3G specification (3GPP) TS23.107. The main focus is on the QoS architecture to be used in the UMTS level, where the list of QoS attributes applicable to UMTS Bearer Service and the Radio Access Bearer Service are specified along with appropriate mapping rules. TS23.060 specifies the general mechanisms used by data packet connectivity services in the UMTS level, which includes the General Packet Radio Service (GPRS) in GSM and UMTS.

In a UMTS QoS Architecture, a network service is considered to be end-to-end, from a Terminal Equipment (TE) to another TE. To realize a certain end-to-end QoS, a bearer service with clearly defined characteristics and functionality is set up from the source to the destination of a service. Again, the bearer service includes those aspects needed to enable the provision of a contracted QoS, e.g., control signaling, user plane transport, QoS management and functionality.

A UMTS bearer service layered architecture is depicted in FIG. 7. Each bearer service on a specific layer offers its individual services using services provided by the layers below. Bearers at one layer are broken down into underlying bearers, to each one providing a QoS realized independently of the other bearers. Service agreements are made between network components, which are arranged horizontally in FIG. 7. The service agreements may be executed by one or more layers of service.

For instance, the UMTS bearer service consists of a Radio Access Bearer (RAB) service and a Core Network (CN) bearer service. The RAB services is then divided into a radio bearer service and a Iu bearer service. The Iu interface is the interface between the radio access network and the core network.

The following are examples of the entities shown in FIG. 7. The terminal equipment (TE) may be a laptop and the mobile terminal (MT) may be a cellular radio handset. The UTRAN may be made up of a combination of radio base stations called Node B's and radio network controllers (RNCs). The Core Network (CN) Iu Edge Node may be a serving GPRS support node (SGSN), and the CN Gateway may be a gateway GPRS support node (GGSN).

The QoS management functions in UMTS are used to establish, modify and maintain a UMTS Bearer Service with a specific QoS, as defined by specific QoS attributes. The QoS management functions of all the UMTS entities ensure provision of the negotiated UMTS bearer service.

The UMTS architecture comprises four management functions in the control plane and four in the user plane. The four control plane management functions are shown in FIG. 8:

Bearer Service (BS) Manager sets up, controls, and terminates the corresponding bearer service. Each BS manager also translates the attributes of its level to attributes of the underlying bearer service during service requests.

Translation function converts between external service signaling and internal service primitives including the translation of the service attributes, and is located in the MT and in the CN Gateway.

Admission/Capability control determines whether the network entity supports the specific requested service, and whether the required resources are available.

Subscription Control determines whether the user has the subscription for the bearer being requested.

The four user plane management functions are:

Classification function resides in the GGSN and in the MT. It assigns user data units (e.g. IP packets) received from the external bearer service from the remote terminal (or the local bearer service) from the local terminal to the appropriate UMTS bearer service according to the QoS requirements of each user data unit. This is where the traffic flow template (TFT) and packet filters are situated, as described below.

Mapping function marks each data unit with the specific QoS indication related to the bearer service to which it has been classified. For example, it adds different service code points to packets before putting them on the Iu or CN bearer.

Resource Manager distributes its resources between all bearer services that are requesting use of these resources. The resource manager attempts to provide the QoS attributes required for each individual bearer service. An example of resource manager is a packet scheduler.

Traffic conditioner is a shaping and policing function which provides conformance of the user data traffic with the QoS attributes of the concerned UMTS bearer service. This resides in the GGSN and in the MT as well as in the UTRAN.

The QoS management functions of the UMTS bearer service in the user plane are shown in FIG. 9. These functions together maintain the data transfer characteristics according to the commitments established by the UMTS bearer service control functions, expressed by the bearer service attributes. The user plane uses the QoS attributes. The relevant attributes are provided to the user plane management functions by the QoS management control functions.

Four different QoS classes standardized in UMTS are shown in FIG. 10.

Data transport may be optimized for the corresponding type of application data or for a bearer service of a certain class. The main distinguishing factor between these classes is how delay sensitive the traffic is: Conversational class is meant for traffic which is very delay sensitive (for real-time services) while Background class is the most delay insensitive traffic class (for non-real time services). Bit error/packet loss rate is also a significant difference between the classes.

To characterize a bearer service in detail, a set of bearer service attributes are standardized in UMTS as shown in the tables referenced below. A certain QoS is requested by selecting a set of attribute values that describes the bearer requirement. Parameters differ depending on the type of bearer service requested. FIG. 11 shows which attributes that are applicable to which traffic class.

FIG. 12 provides an overview of uses for different QoS attributes. The exact definitions of the QoS attributes can be found in TS23.107. A subscription is associated with one or more Packet Data Protocol (PDP) addresses, i.e., IP addresses in the case of IP traffic. Each PDP address is described by one or more PDP contexts stored in the MS, the SGSN, and the GGSN. Default values are also available in the cellular system data base, e.g., the HLR, which holds the subscription information. Each PDP context may be associated with a Traffic Flow Template (TFT). At most, one PDP context (associated with the same PDP address) may exist at any time with no TFT assigned to it. The relationship between PDP address, PDP context, and TFT is provided in FIG. 13.

A PDP context is implemented as a dynamic table of data entries, comprising all needed information for transferring PDP PDUs between MS and GGSN, for example addressing information, flow control variables, QoS profile, charging information, etc. The relation between UMTS bearer services and PDP context is a one-to-one mapping, i.e., if two UMTS bearer services are established for one PDP address, two PDP contexts are defined. The PDP context procedures are standardized in TS23.060. The concepts surrounding the QoS profile and the Traffic Flow Template (TFT) are relevant from the QoS perspective.

The UMTS QoS attributes have been selected and defined mainly for supporting efficient radio realization. A QoS profile is defined by a set of UMTS QoS attributes. The RNC obtains the pertinent radio access bearer (RAB) QoS profile from the SGSN during PDP context activation. There are three different QoS profiles involved in a PDP context activation—the requested QoS profile, the negotiated QoS profile, and the subscribed QoS profile (or the default QoS profile).

A Traffic Flow Template (TFT) is a packet filter (or set of filters) that associates packets to the correct PDP context thereby ensuring that packets are forwarded with correct QoS characteristics. The TFT enables the possibility of having several PDP contexts with varying QoS profiles, associated to a single PDP address. The TFT is managed and initiated by the MT both for the uplink and downlink flows. The uplink TFT resides in the MT, while the downlink TFT resides in the GGSN. The downlink TFT is sent from the MT to the GGSN during PDP context activation/modification. The downlink TFT's may be added to a PDP context that was created without one, and the contents may be modified as well.

FIG. 14 shows TFT packet filter attributes and valid combinations. Each TFT has an identifier and an evaluation precedence index that is unique within all TFT's associated with the PDP contexts that share the same PDP address. The MS manages the identifiers and the evaluation precedence indices of the TFT's, as well as the packet filter contents. Some of the attributes in FIG. 14 may coexist in a packet filter while others mutually exclude each other. Only those attributes marked with an "X" may be specified for a single packet filter. All the marked attributes may be specified, but at least one has to be specified.

The PDP context signaling carries the requested and negotiated QoS profile between the nodes in the UMTS network. It has a central role for QoS handling in terms of admission control, negotiation, and modifying of bearers on a QoS level. The PDP context signaling message exchanges are described below with reference to the numerals in FIG. 15.

1. An RRC connection establishment is performed. This procedure is needed for establishing a connection, but does not cover more from a QoS perspective than that the type of radio channel is roughly indicated.

2. The MS sends a PDP message, "Activate PDP context request," to the SGSN. The requested QoS profile is included in this message. At this stage, the SGSN makes an admission check and might restrict the requested QoS if the system is overloaded.

3. The SGSN sends a RANAP message, "RAB Assignment Request," to the RNC in the UTRAN. RANAP, or Radio Access Network Application Part, is an application protocol for supporting signaling and control transmission between the UTRAN and the external CN. RANAP permits communication between the UTRAN and circuit-switched or packet-switched networks. This request to establish a radio access bearer (RAB) service carries the (perhaps modified) RAB QoS attributes.

4. From the RAB QoS attributes, the RNC determines the radio-related parameters corresponding to the QoS profile, e.g., transport format set, transport format combination set, etc. In addition, the UTRAN performs an admission control on this bearer.

5. The RNC sends an RRC message, "Radio Bearer Set-up," to the MS. The RRC message includes the radio-related parameters that were determined in step 4.

6. The UTRAN and the MS apply the radio parameters and are ready to transfer traffic. To signal this, the MS sends a "Radio Bearer Set-up Complete" RRC message to the RNC.

7. The UTRAN sends a "RAB Assignment Complete" RANAP message to the SGSN.

8. A Trace procedure may be initiated. This is an operation and maintenance function for surveying subscribers.

9. The SGSN sends a "Create PDP Context Request" to the GGSN carrying the QoS profile. However, the QoS profile may have different parameters than those requested by the MS in step 2. Based on this profile, an admission control is performed at the GGSN level, and the GGSN may restrict the QoS if, for example, the system is overloaded. The GGSN stores the PDP context in its databases.

10. The GGSN returns the negotiated QoS to the SGSN in a "Create PDP Context Response"0 message and the SGSN stores the PDP context in its database.

11. The negotiated QoS is sent from the SGSN to the MS in an "Activate PDP Context Accept" message. If either the SGSN or the GGSN has modified the QoS profile, then the MS has to either accept or reject this profile.

Several admission controls take place in the procedure. Because bandwidth associated with radio is the most expensive resource, the UTRAN is consulted in determining whether radio resources are available during PDP context activation or modification. In other words, admission control in UMTS is performed in a radio centric manner.

To provide IP QoS end-to-end, it is necessary to manage the QoS within each domain. An IP BS Manager in the Gateway is used to control the external IP bearer service. Due to the different techniques used within the IP network, this is communicated to the UMTS BS manager through the Translation function. There is a likewise a need for an IP bearer service manager function to be provided in UE, where the bearer service manager maps the QoS requirements of the application to the appropriate QoS mechanisms. FIG. 16 shows the embodiment for control of an IP service using IP BS Managers in both possible locations in the UE and Gateway node. FIG. 16 also indicates the optional communication path between the IP BS Managers in the UE and the Gateway node. The IP BS Managers use standard IP mechanisms to manage the IP bearer service. These mechanisms may be different from mechanisms used within the UMTS, and may have different parameters controlling the service. The translation/mapping function provides the interworking between the mechanisms and parameters used within the UMTS bearer service and those used within the IP bearer service, and interacts with the IP BS Manager. If an IP BS Manager exists both in the UE and the Gateway node, it is possible that these IP BS Managers communicate directly with each other by using relevant signaling protocols.

An IP Multimedia Service ("IMS") may be defined "on top" of the GPRS bearer service to provide multimedia sessions to end users. The quality of service aspects of bearers supporting IP multimedia is specified in the 3GPP TS 23.207, and the IP multimedia specification is set forth in the 3GPP TS 23.228. The IMS is based on IP application signaling, which in a preferred, example embodiment includes session initiation protocol (SIP) and session description protocol (SDP). SIP is a signaling protocol to establish sessions, and SDP is a text-based syntax to describe the session and includes, for example, the definition of each media stream in the session.

For multimedia sessions, it is important that network managers and services providers be able to monitor, control, and enforce the use of network resources and services based on "policies" derived from certain established criteria such as the identity/authority level of users and applications, traffic bandwidth requirements, security considerations, time of day/week, etc. Because there are varying circumstances in which various entities are entitled to use the services they request, there is a need for rules, a need for enforcement methods of these rules, and a need for a "judge" to decide when they apply. Accordingly, three major components of a policy system include policy rules, which are typically stored in a policy database, policy enforcement, which may be implemented at Policy Enforcement Points (PEP), and Policy Decision Points. The IETF has standardized a protocol for information exchange between PEPs and Policy Decision Points under the term Common Open Policy Service (COPS). In general, a policy may be regarded as a collection of rules that result in one or more actions when specific conditions exist.

Session level policy controls, such as the service-based local policy control described in commonly-assigned U.S. patent application Ser. No. 09/861,817, entitled "Application Influenced Policy," cannot automatically be applied to PDP contexts unless the relationship of the various media streams to the PDP contexts is known. That is because such relationships are under the control of the end user establishing the multimedia session, the various media streams, and the corresponding quality of service parameters associated with those media streams.

A chief problem addressed by this invention is how to communicate effectively and efficiently the relationship between a session, media flows in that session, and PDP context bearers established for those media flows in order to request, reserve, supply, and enforce the resources necessary to support each media flow at the PDP bearer level. This problem is compounded in end-to-end user sessions where the backbone network uses one protocol, e.g., RSVP, to manage/reserve backbone resources for a session while the mobile terminal/UMTS network uses another protocol, e.g., PDP context information, to interwork with backbone quality of service reservation/management mechanisms. Hence, the interworking and cooperation between such different quality of service reservation/management mechanisms is critical to ensure end-to-end quality of service. To enable interworking between these two QoS domains with different signaling protocols, the interworking node must be able to receive service requests from one domain, and generate the necessary service request to the other domain. The interworking node must obtain the necessary service information for the service request to be generated. Where this information is not provided by the service request, the interworking node must receive a "key" enabling it to access the additional required information from another source.

The present invention overcomes these and other problems by providing an efficient and effective mechanism for binding packet access/bearers in the UMTS to the multimedia streams in a session they support to permit session level control of those bearers, e.g., requesting, reserving, supplying, and enforcing IP level resources needed to support the session. This mechanism also enhances the interaction between UMTS packet access bearers and quality of service reservation and management mechanisms employed by the IP backbone network. IP-level elements in a PDP context activation/modification message include binding information to link each of plural media PDP contexts/data streams to a multimedia session and to a corresponding packet access bearer. As a result, network operators can then identify the multimedia session and apply policy control to each of the media PDP contexts/media streams/packet access bearers in the session. One desirable policy control approach is service-based local policy control described, for example, in commonly-assigned U.S. patent application Ser. No. 09/861,817 entitled "Application Influenced Policy," filed on May 21, 2001.

In general, the present invention provides a method for use in setting up and orchestrating a multimedia session involving a mobile terminal. Using session signaling, a multimedia session with plural media data streams is initiated between the mobile terminal and a remote host coupled to a packet data network. The mobile terminal is coupled to the packet data network and to a multimedia system that provides multimedia session services by way of an access point. A plurality of packet access bearers is established between the mobile terminal and the access point to transport corresponding ones of the media data streams between the mobile terminal and the access points. Media binding information is created for each media data stream. The media binding information associates each media data stream in the session to one of the media packet access bearers and is used to provide session-based control of each of the media packet access bearers.

Local media binding information may be generated for each media data stream for use in a local domain of the mobile terminal. Local media binding information is also generated for each media data stream for use in a local domain of the remote host. Alternatively, the media binding information generated for each media data stream may be used in both local domains of the mobile terminal and the remote host.

The media binding information may be created/provided in any number of ways. In one example, non-limiting embodiment, the media binding information is included in a message portion of the session signaling and may be to included, for example, with the media definition. The session signaling may employ, in a preferred example, session initiation protocol (SIP) with a message portion that uses session description protocol (SDP). In other words, the media binding information may be included in the SDP information for the multimedia session, e.g., as an SDP extension.

In another example, non-limiting embodiment, the media binding information for one of the media data streams includes a session identifier that identifies the session and a media data stream identifier corresponding to the one media data stream. The session identifier is carried in the session signaling, and the media data stream identifier is generated by one or more nodes/entities involved at the session level in the session signaling. Such nodes or entities include one or more of the following: the mobile terminal, the access point, the policy decision point, the multimedia system, and the remote host. The one or more nodes use a predetermined procedure for determining the media data stream identifier. In one example, the session identifier is included in session authorization signaling, and the media flow identifier for the corresponding media flow is added to the session identifier to generate the media binding information for that media flow. If SDP is used to define the media flows in the multimedia session, the media flow identifier may be a number corresponding to a sequential number of the media definitions in the SDP for that multimedia session.

Other methods may be used to create/provide the media binding information. Regardless of the specific method used, the present invention provides session level monitoring and control of each of the media packet access bearers using the media binding information. In addition, if a parameter, e.g., a bit rate parameter, of one of the media data streams changes during the session or a media stream is added or removed, the corresponding media binding information also changes.

BRIEF DESCRIPTION OF THE DRAWINGS

The foregoing and other objects, features, and advantages of the present invention may be more readily understood with reference to the following description taken in conjunction with the accompanying drawings.

FIG. 10 is a table of UMTS quality of services classes;

FIG. 11 is a table of quality of service attributes;

FIG. 12 is a table providing an overview of some uses for the quality of service attributes illustrated in FIG. 11;

FIG. 14 is a table of valid combinations of TFT packet filter attributes;

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in an example application to the GSM/UMTS system, the present invention may be employed in any access network system.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

In the following description, a mobile terminal is used as one example of a user equipment (UE) allowing a user access to network services. In a mobile radio communications system, the interface between the user equipment and the network is the radio interface. Thus, although the present invention is described using the term "mobile terminal," the present invention may be applied to any type or configuration of user equipment that can communicate over a radio interface or a fixed user to network interface.

As explained above, to provide IP quality of service end-to-end from mobile terminal to a remote host, it is necessary to manage the quality of service within each domain in the end-to-end path where each domain corresponds to a set of nodes utilizing the same QoS mechanisms. An IP bearer service manager may be used to control the external IP bearer service through the external packet data network, e.g., the Internet, to the remote host. However, there must be a way to interwork resources owned or controlled by the UMTS network and resources in the external packet data network. This is particularly important for multimedia-type communications between a mobile terminal and remote host.

Figure 1:
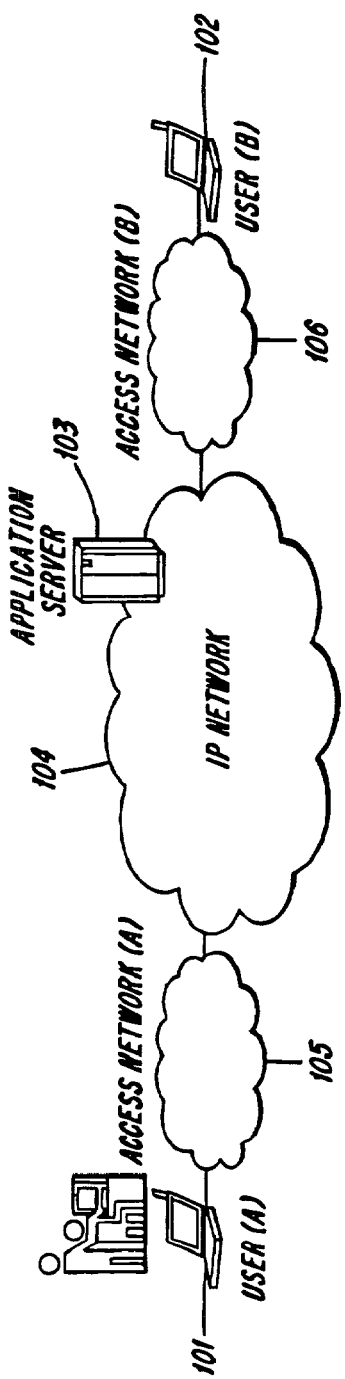
FIG. 1 is a block diagram of a high level IP network.
Figure 2:
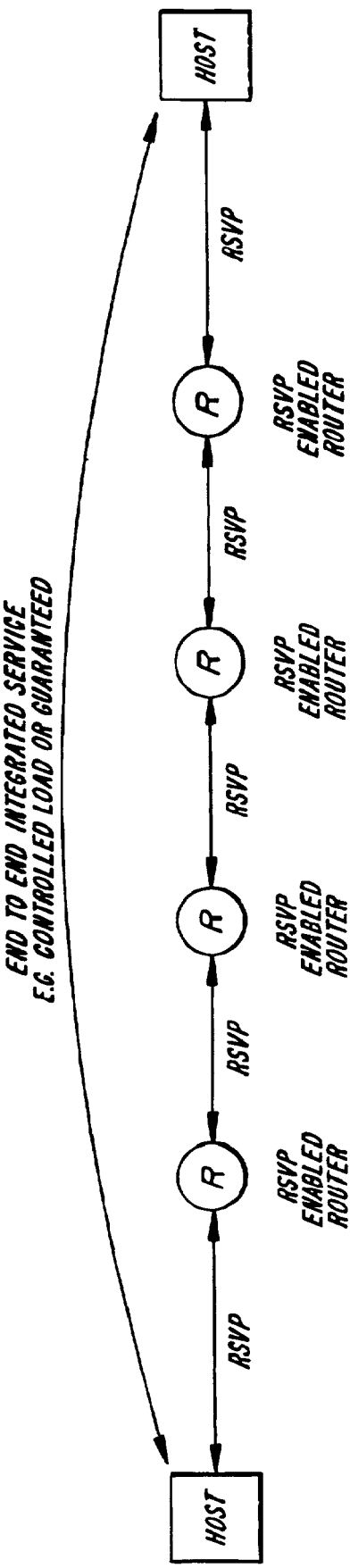
FIG. 2 is a block diagram depicting an example of a network employing end-to-end integrated services.
Figure 3:
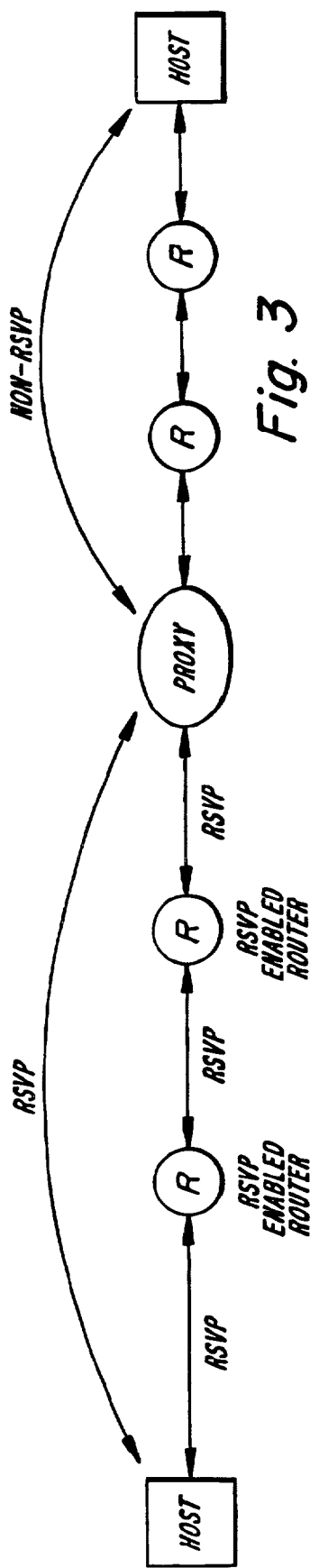
FIG. 3 is a block diagram depicting an example of a network employing an RSVP proxy.
Figure 4:
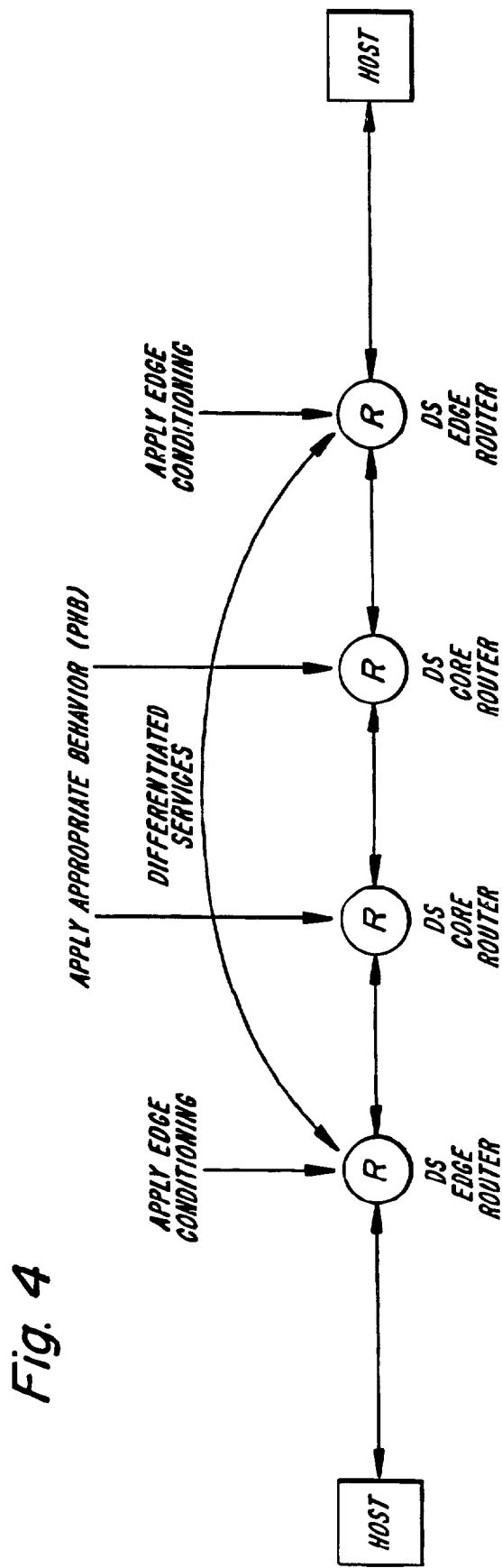
FIG. 4 is a block diagram depicting an example of a network employing end-to-end differentiated services.
Figure 5:
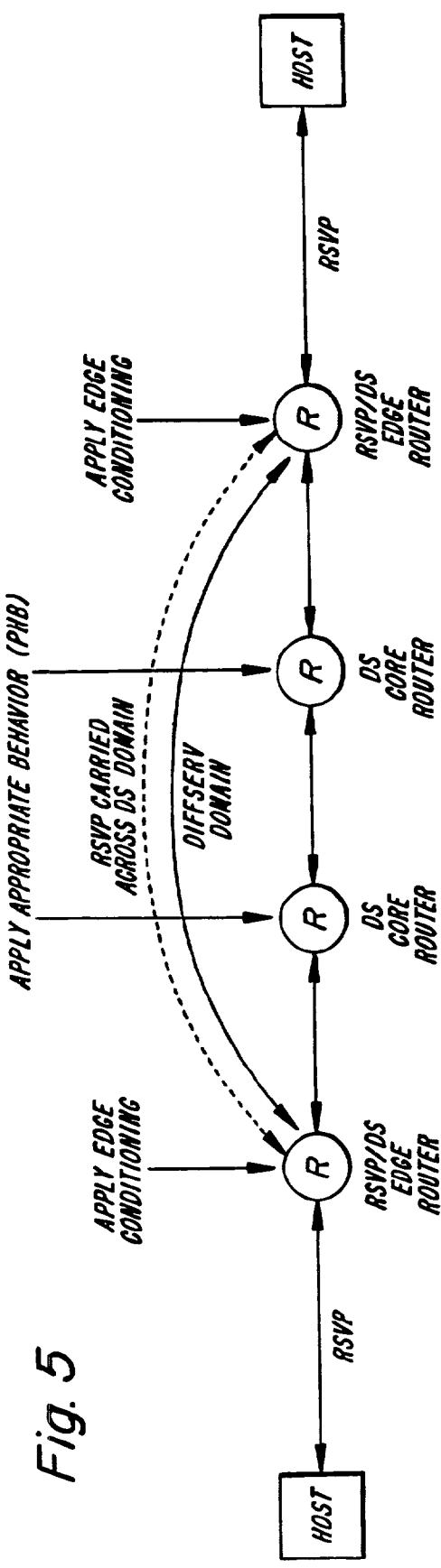
FIG. 5 is a block diagram depicting an example of a network employing RSVP signaling interworking with differentiated services.
Figure 6:
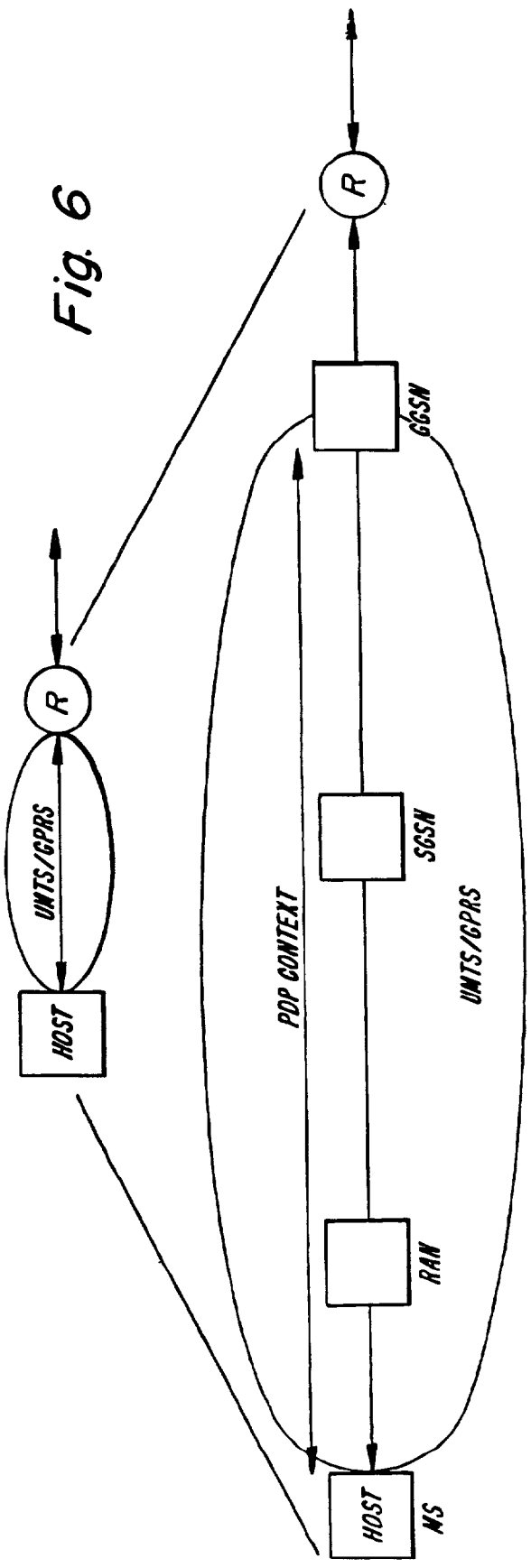
FIG. 6 is a block diagram depicting a mobile access data network modeled as a DiffServ network.
Figure 7:
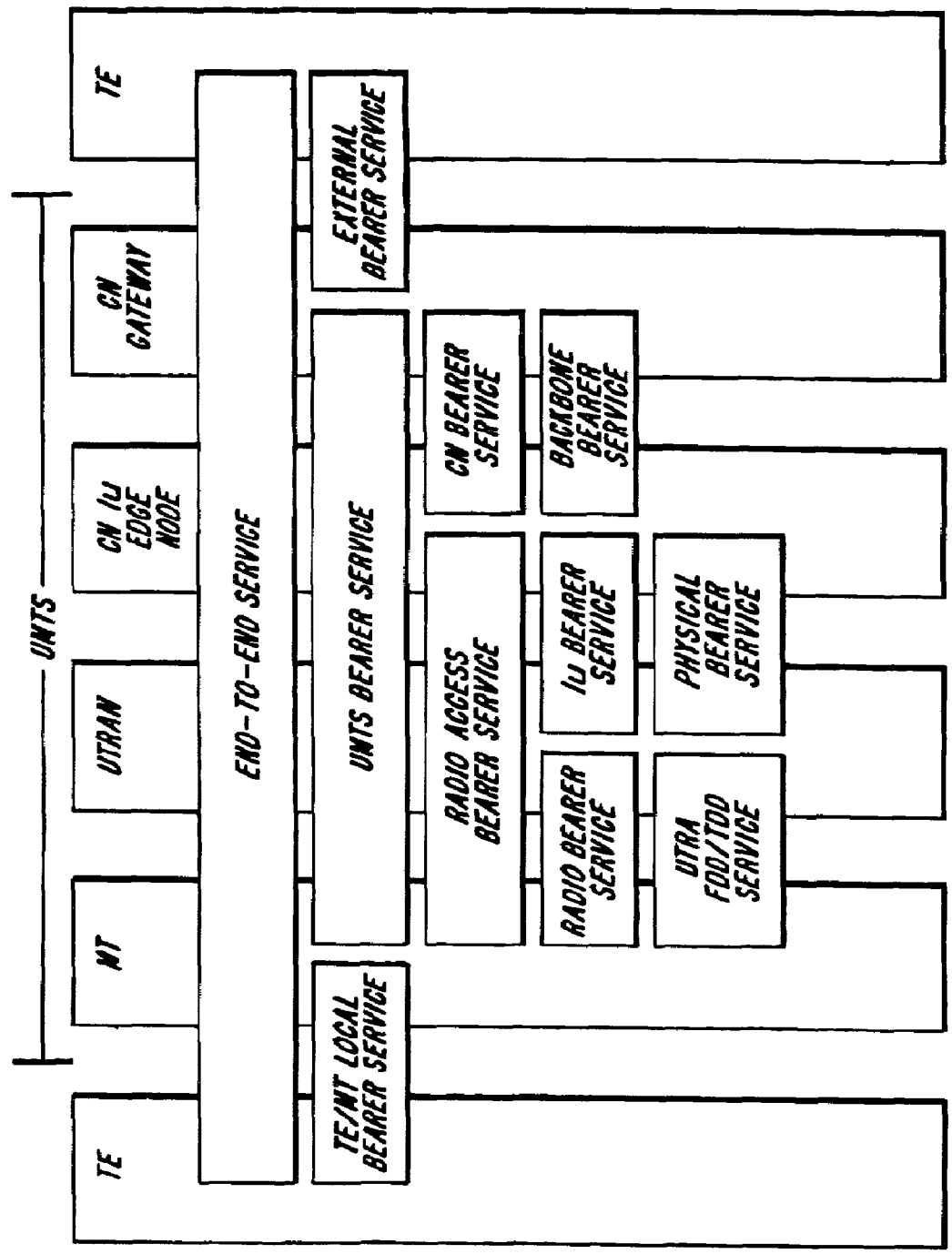
FIG. 7 is a block diagram of a UMTS quality of service architecture.
Figure 8:
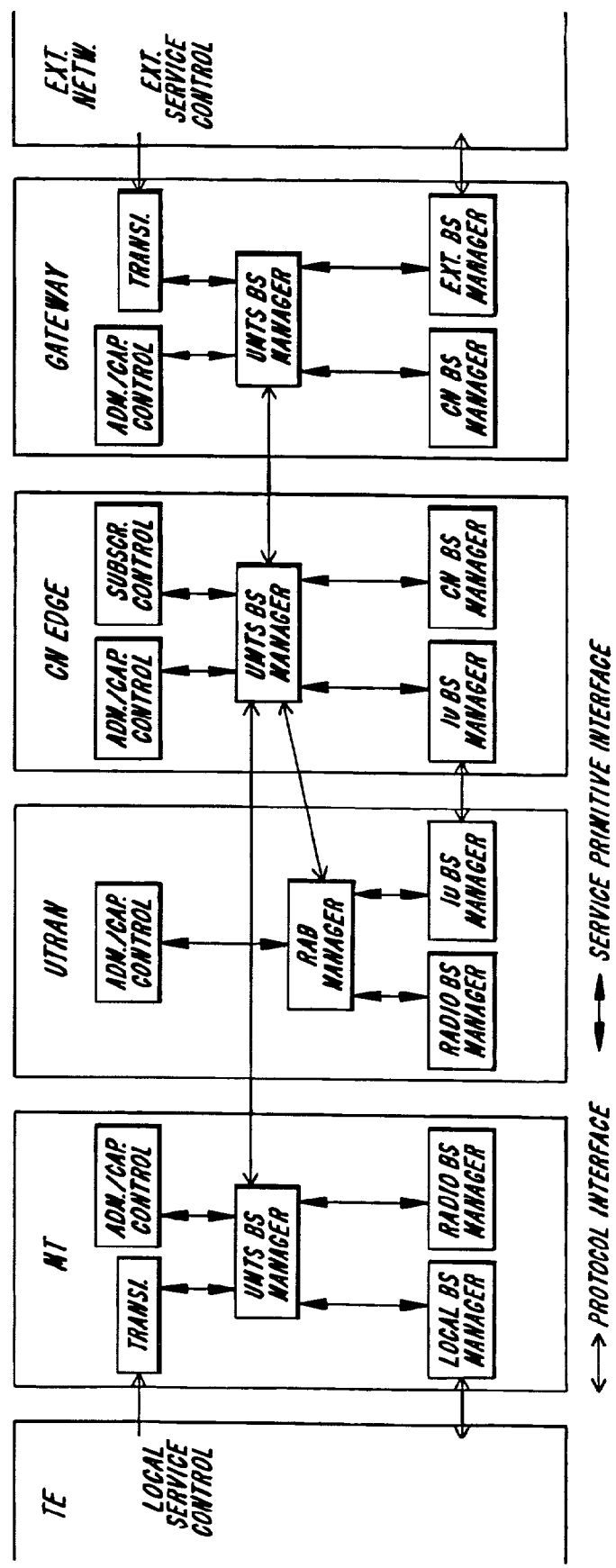
FIG. 8 is a block diagram depicting quality of service management for UMTS bearer services in the control plane.
Figure 9:
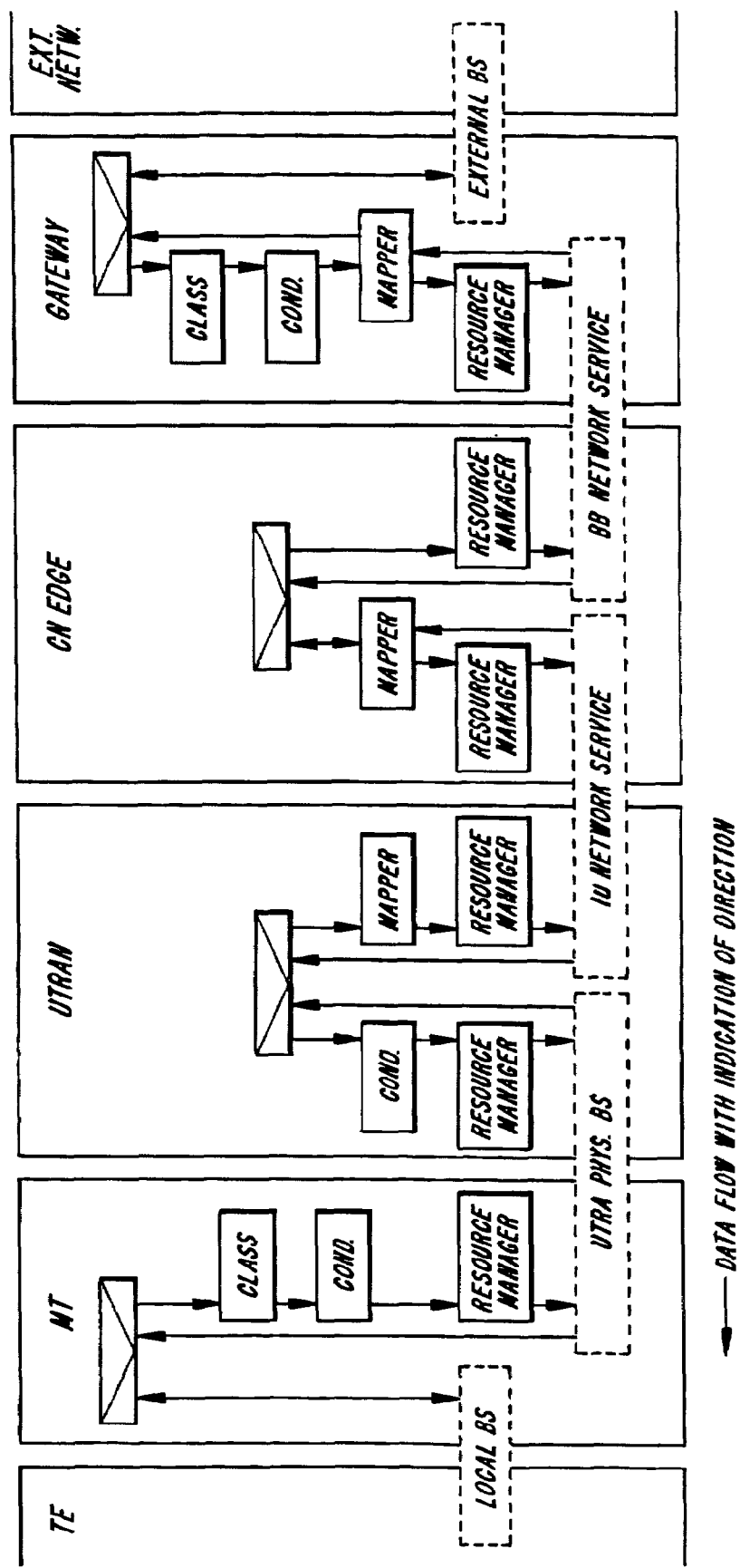
FIG. 9 is a block diagram depicting quality of service management functions for UMTS bearer services in the user plane.
Figure 13:
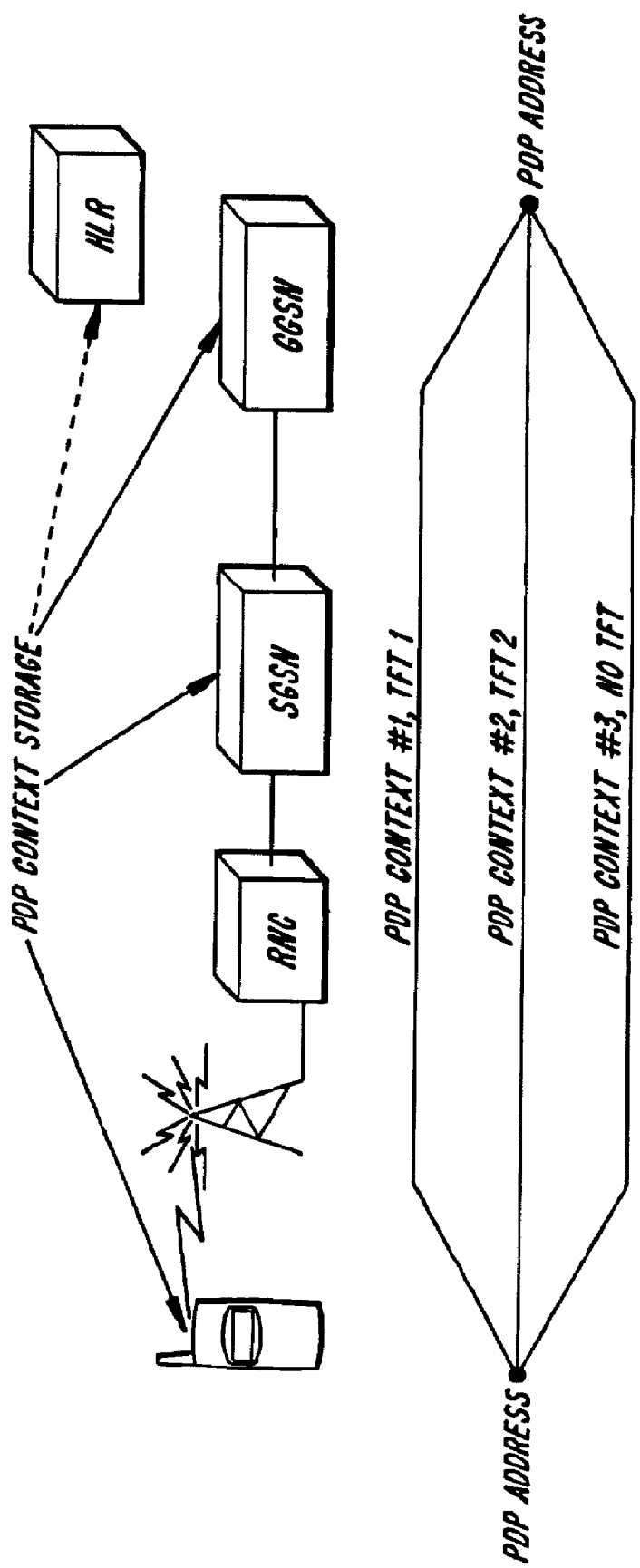
FIG. 13 is a block diagram of the relationship between PDP address, PDP context, and TFT.
Figure 15:
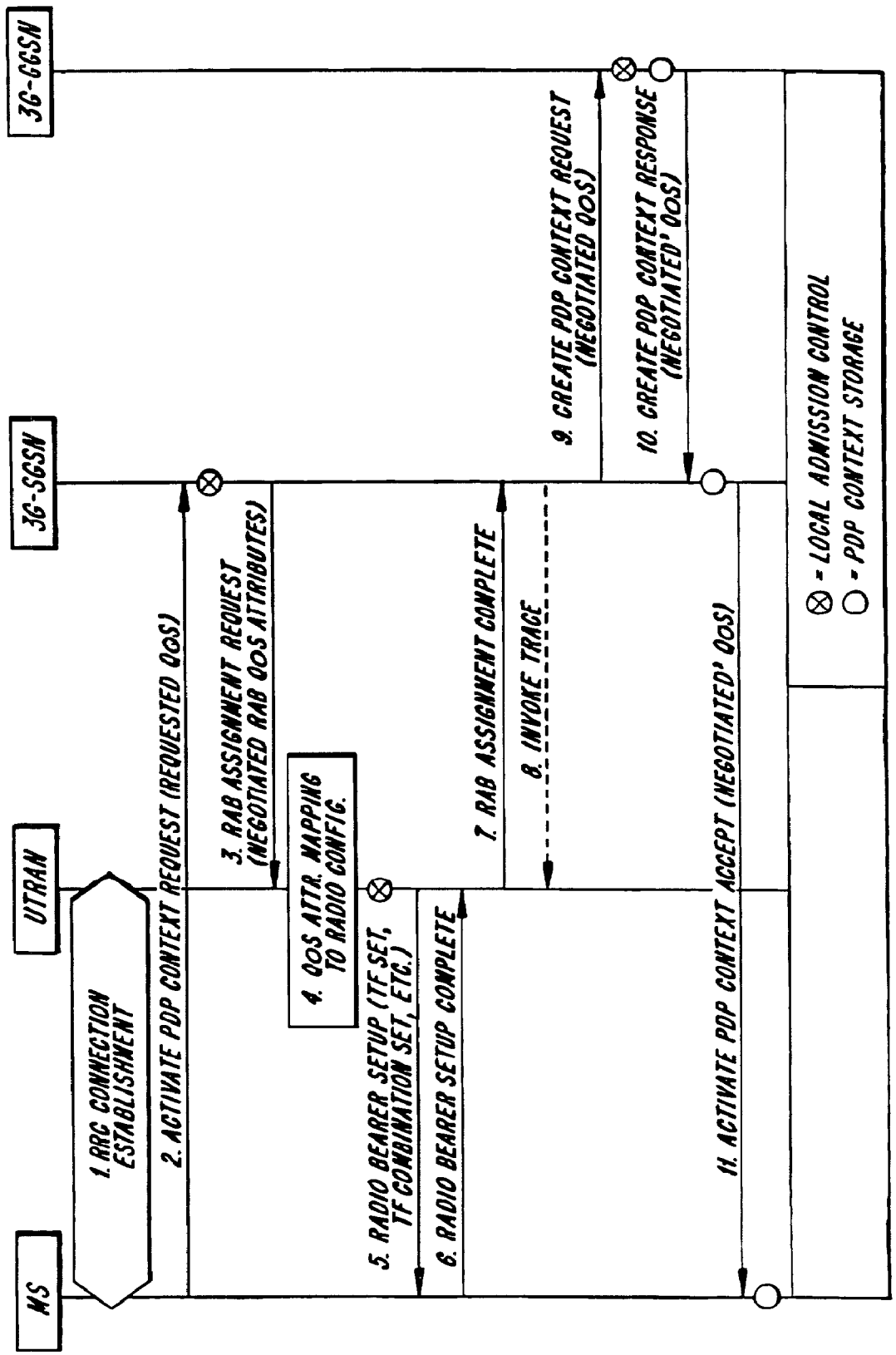
FIG. 15 is a diagram of PDP context message exchanges.
Figure 16:
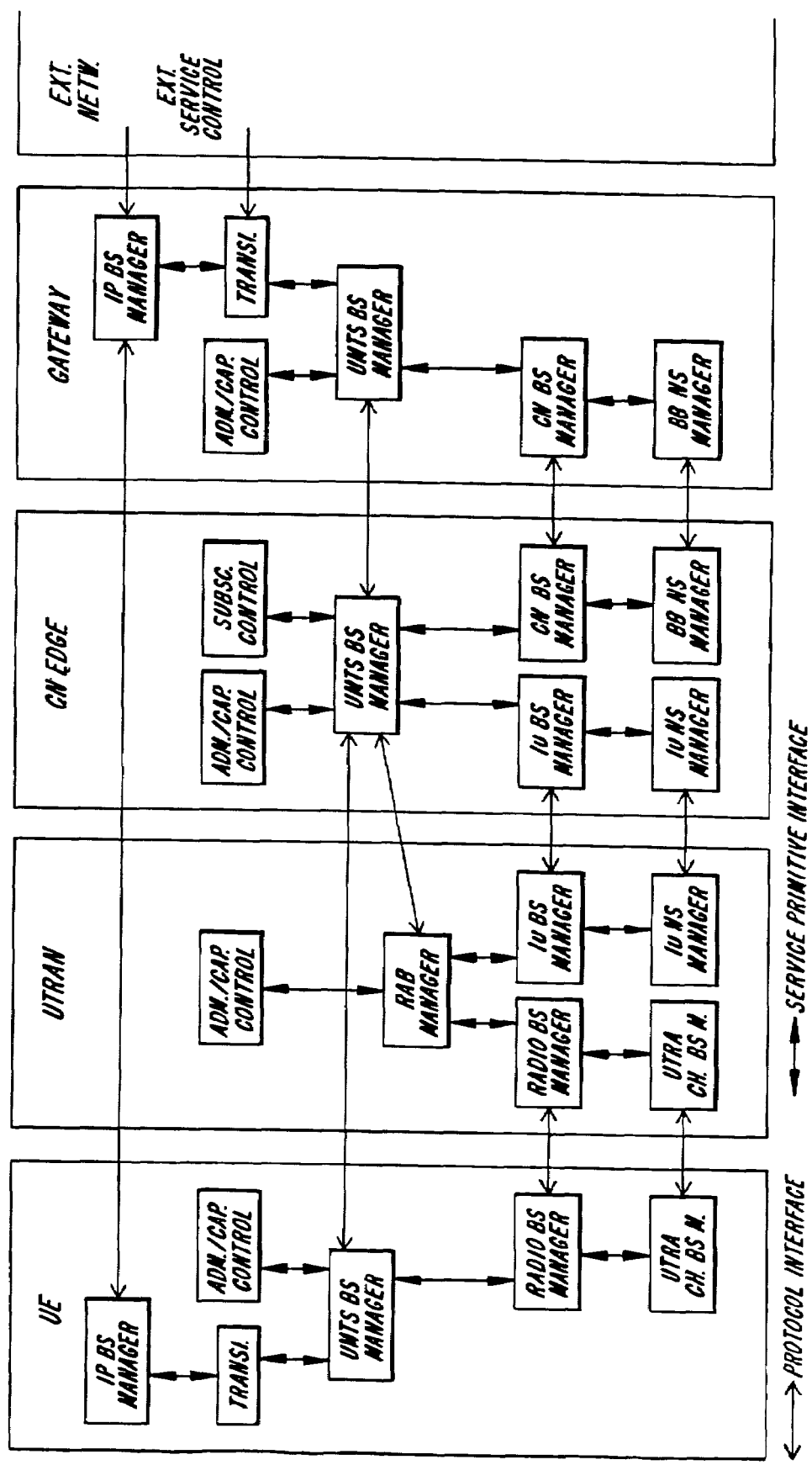
FIG. 16 is a block diagram of the quality of service management functions for UMTS bearer services in the control plane and quality of service management functions for end-to-end IP quality of service.
Figure 17:
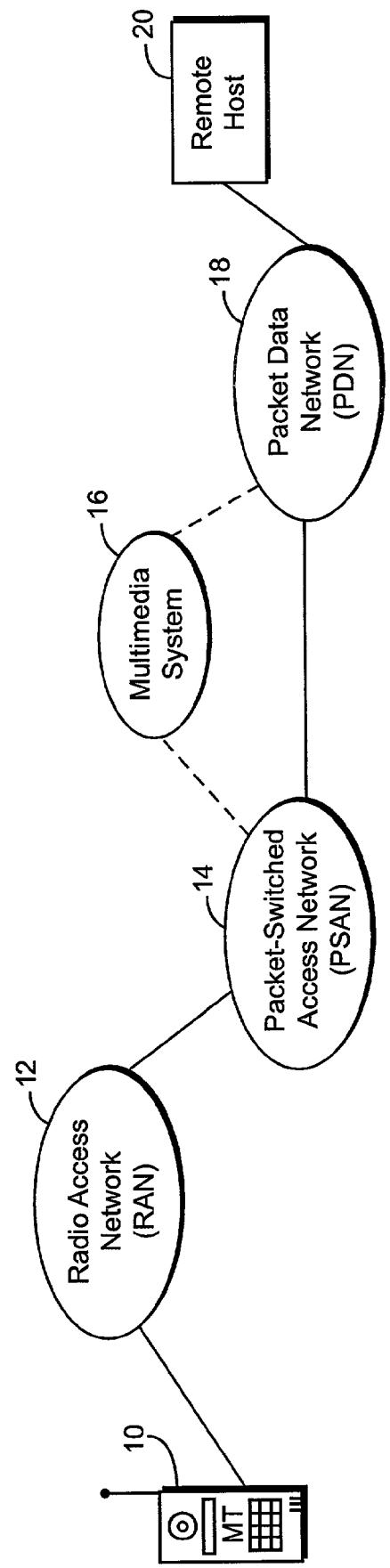
FIG. 17 illustrates a communications system in which a multimedia session may be established between a mobile terminal and a remote host.

Consider the example, simplified communications system shown in FIG. 17 which permits a Mobile Terminal (MT) 10 to initiate and conduct a multimedia session with a remote host 20. The remote host 20 can be a fixed or wireless device. The mobile terminal 10 is coupled to a radio access network (RAN) 12 over the radio interface. The RAN 12 is coupled to an Access Point in a packet-switched access network (PSAN) 14, which in turn is coupled to a Packet Data Network (PDN) 18 to which the remote host 20 is coupled. The basic traffic flow for a multimedia session (shown as solid lines) between the mobile terminal 10 and the remote host 20 is transported via these three networks 12, 14, and 18. The PSAN 14 and the PDN 18 communicate multimedia control signaling (shown as dashed lines) to a Multimedia System 16 that can be separate from or an integral part of the Packet Data Network 18.

In addition to quality of service interworking, it is desirable to provide a mechanism to support service-based local policy enforcement on individual multimedia flows in the session. The present invention provides an effective and efficient way to provide end-to-end IP quality of service and to manage that quality of service within each domain in the end-to-end path in a multimedia session using media binding information. This media binding information permits interworking of resources owned or controlled by the UMTS network with resources in the external packet data network. Furthermore, the media binding information provides a mechanism to support service-based policy enforcement on individual multimedia flows in the session.

Figure 18:
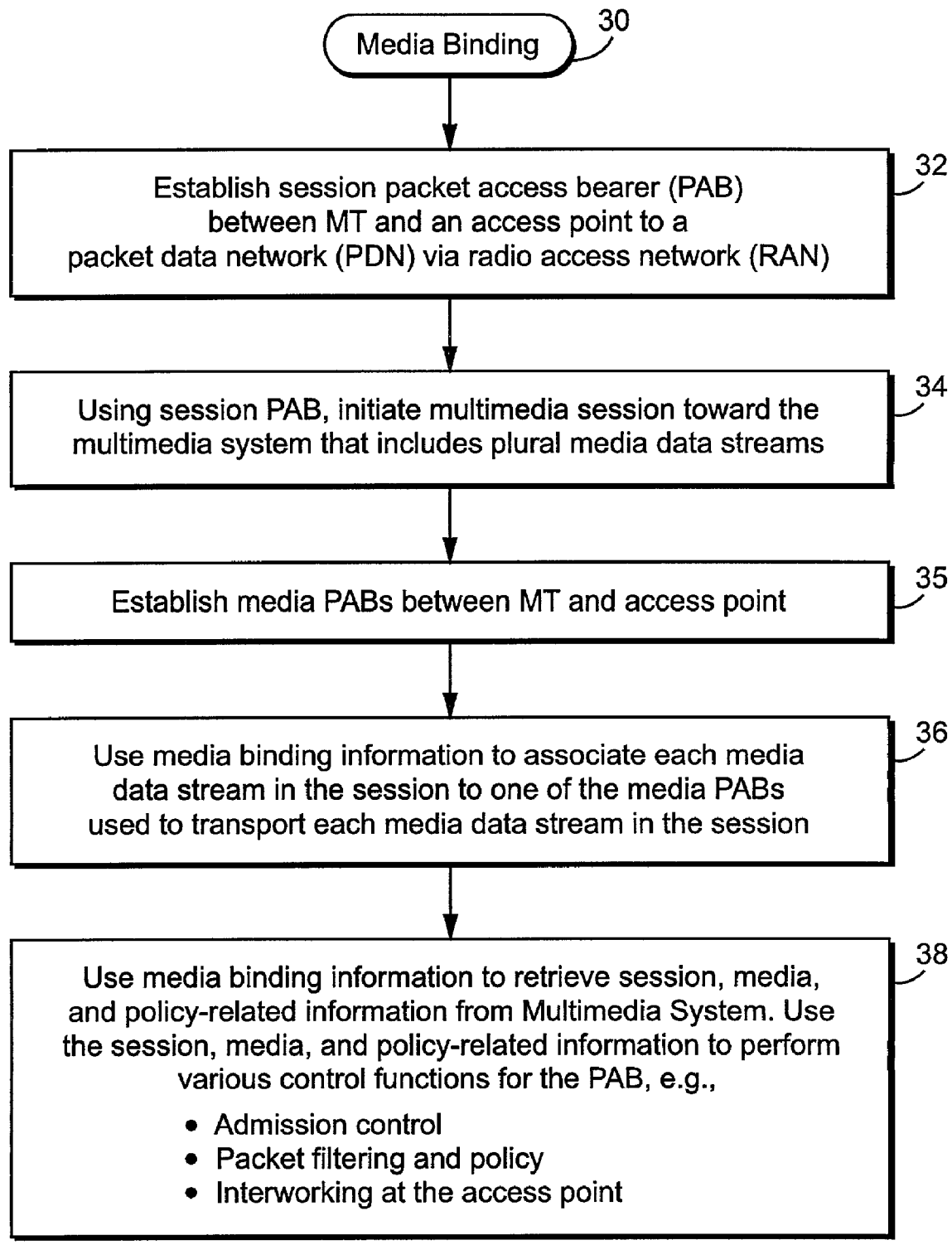
FIG. 18 illustrates in flowchart form procedures for media binding in accordance with an example embodiment of the present invention.

Reference is now made to a media binding (block 30) set of procedures shown in flowchart form in FIG. 18. Initially, a session packet access bearer (PAB) between the mobile terminal 10 and the access point 14 to the packet data network (PDN) 18 via the radio access network (RAN) 12 (block 32). Using the session packet access bearer, the mobile terminal initiates a multimedia session with the remote host 20 that includes plural media data streams (block 34). Media packet access bearers corresponding to each of the plural media data streams are established between the mobile terminal 10 and the access point 14 (block 35). Media binding information is used to associate each media data stream in the session to one of the media access bearers used to transport each media data stream in the session (block 36). In addition, the media binding information is used to retrieve session, media, and policy-related information from the multimedia system, which in turn is used to perform various control functions for the packet access bearer. Example functions include admission control, packet filtering and policing, and interworking at the access point (block 38).

Figure 19:
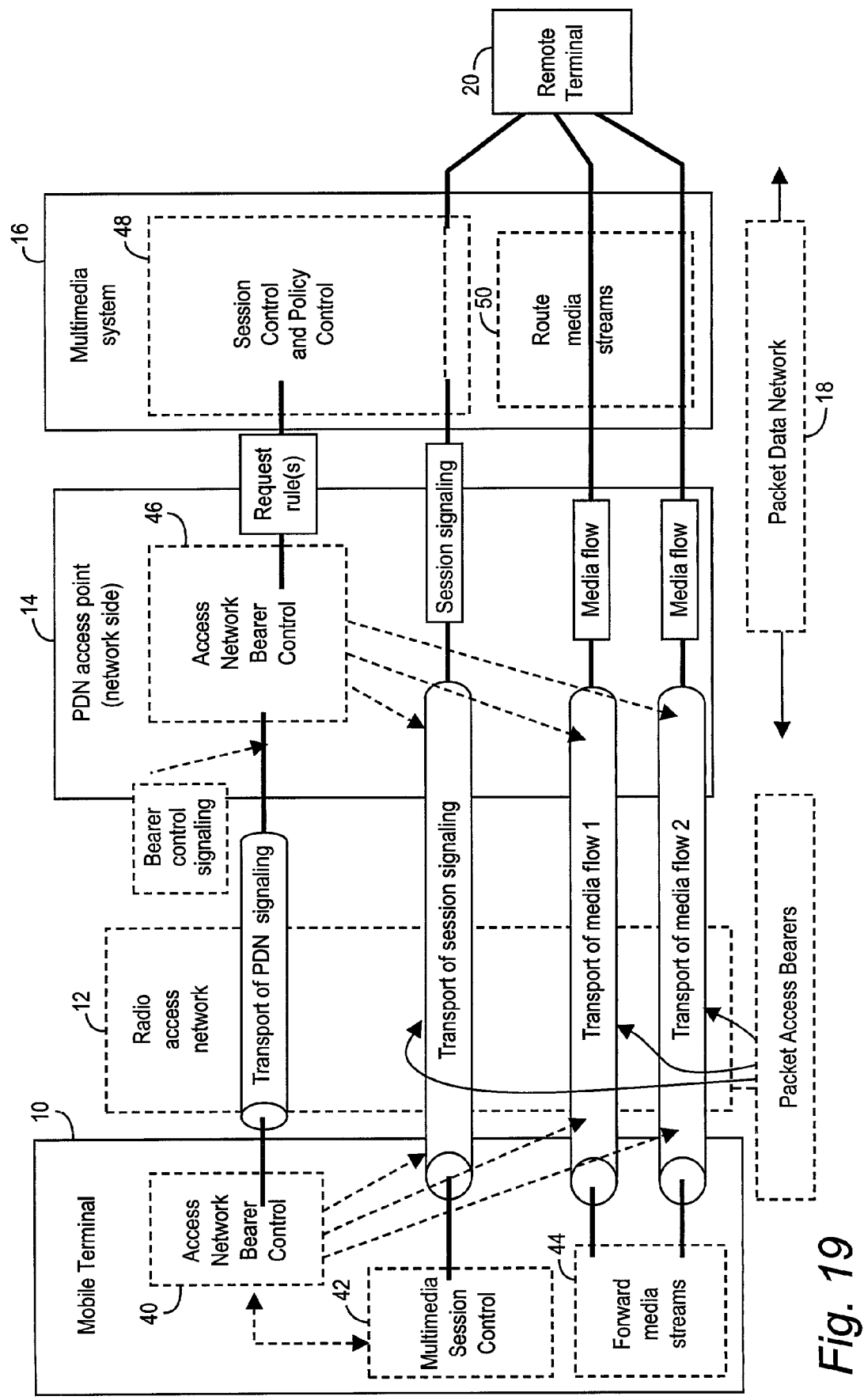
FIG. 19 illustrates in more detail a multimedia session in the communications system shown in FIG. 17.

FIG. 19 illustrates, in a functional block diagram format, elements involved in setting up a multimedia session. The mobile terminal 10 includes Access Network Bearer Control 40 coupled to multimedia session control 42. The Access Network Bearer Control block 40 transports internal bearer control signaling, which is not dedicated to a particular session, to an Access Network Bearer Control block 46 in the packet data network access point 14 transparently over the radio access network over a PDN signaling transport bearer. Both Access Network Bearer Control blocks 40 and 46 assist in establishing a packet access bearer for setting up the session shown as the pipe entitled "transport of session signaling." Over this bearer, the mobile terminal 10 initiates a multimedia session including a plurality of media data streams with the remote terminal 20. Each media data stream or "flow" is transported over a corresponding packet access bearer illustrated as a "transport of media flow" pipe coupled to a Forward Media Streams block 44 in the mobile terminal. Two media flows 1 and 2 are shown for purposes of illustration in this multimedia session. The multimedia system 16 in the packet data network 18 employs a Route Media Streams block 50 to route the packets in each media flow between the mobile terminal 10 and the remote terminal/host 20. Multimedia system 16 also includes a Session Control and Policy Control block 48 that utilizes the session signaling from the Multimedia Session Control block 42 in the mobile terminal 10 to correlate each multimedia flow and its corresponding quality of service requirements with the session to establish necessary admission and policy enforcement rules for the session. Those rules are provided upon request to the Access Network Bearer Control block 46 which performs admission and policy enforcement operations for the session in accordance with the obtained session rules.

Figure 20:
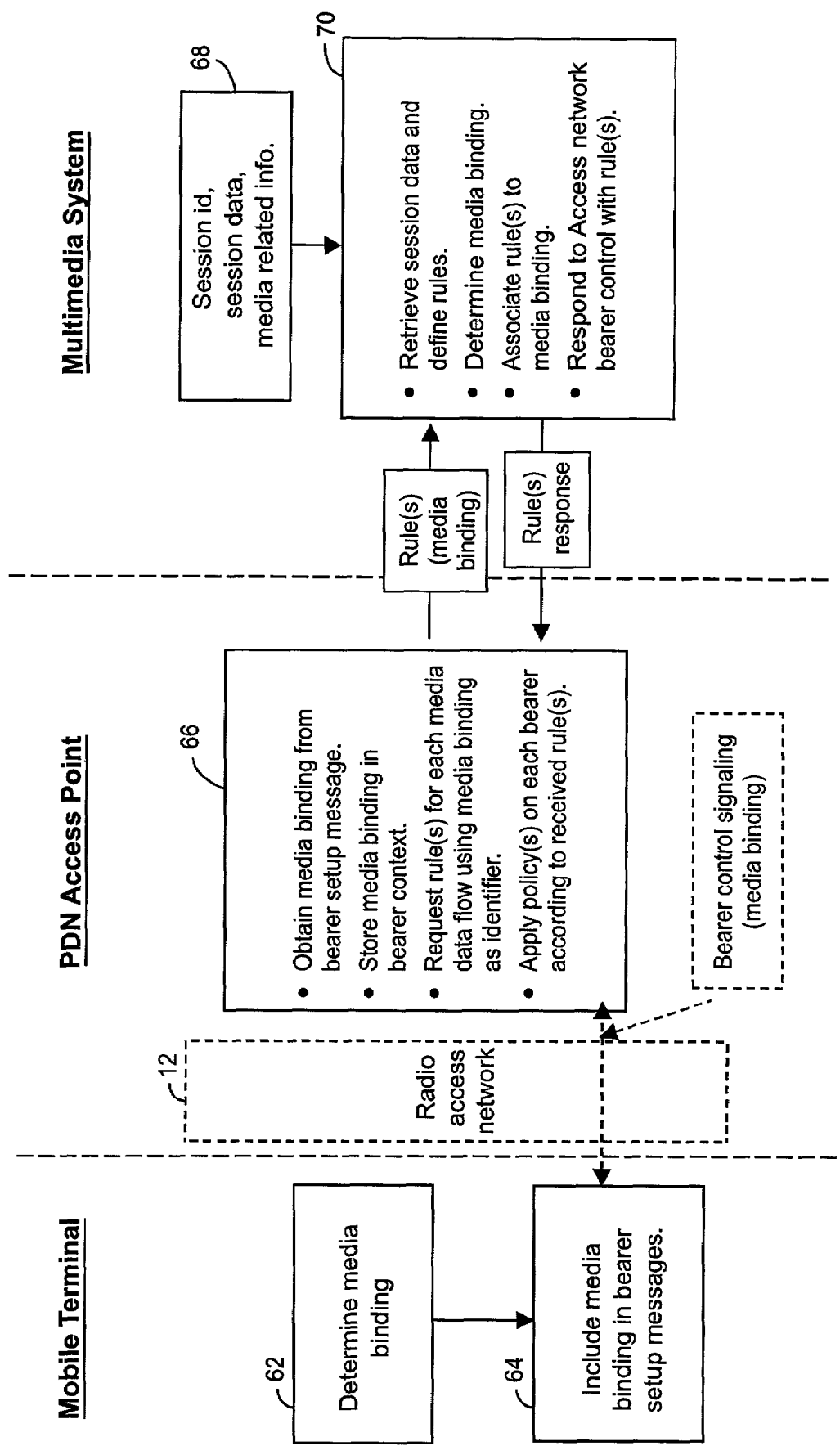
FIG. 20 illustrates in block format various functions performed by the mobile terminal, packet data network access point, and multimedia system.

FIG. 20 is a block diagram that provides additional details of the control functions and signaling generally illustrated in FIG. 19. To simplify the illustration and discussion, the media flows are not shown in FIG. 20. The mobile terminal determines media binding information specific to each media flow in the session (block 62). The media binding information is included in packet access bearer setup signaling for each media flow packet access bearer established for the session between the mobile terminal 10 and the access point 14. See the bearer control signaling block in dashed lines containing the media binding information for each media flow. As illustrated in block 66 at the PDN access point, the media binding information for each flow is obtained from corresponding bearer setup messages. The media binding information is stored in the PDN access point as a part of the packet access bearer context characterizing the packet access bearer. In addition, the access point requests from the multimedia system rule(s) for each packet access bearer using the media binding information as an identifier. The multimedia system has stored the session identifier, session-related data, and media-related information for the requested session (block 68). Using the session-related data and media-related information, the multimedia system defines appropriate rules for each media flow and thus also for each packet access bearer in the session (block 70). In response to the session rules being requested for each media flow/packet access bearer using the media binding as an identifier from the access point, the multimedia system retrieves the rules using the media binding information as a "key" and provides them to the packet data network access point in a rule(s) response message. The access point performs policy enforcement mechanisms such as one or more filters on each media data flow according to the received rules.

Figure 21:
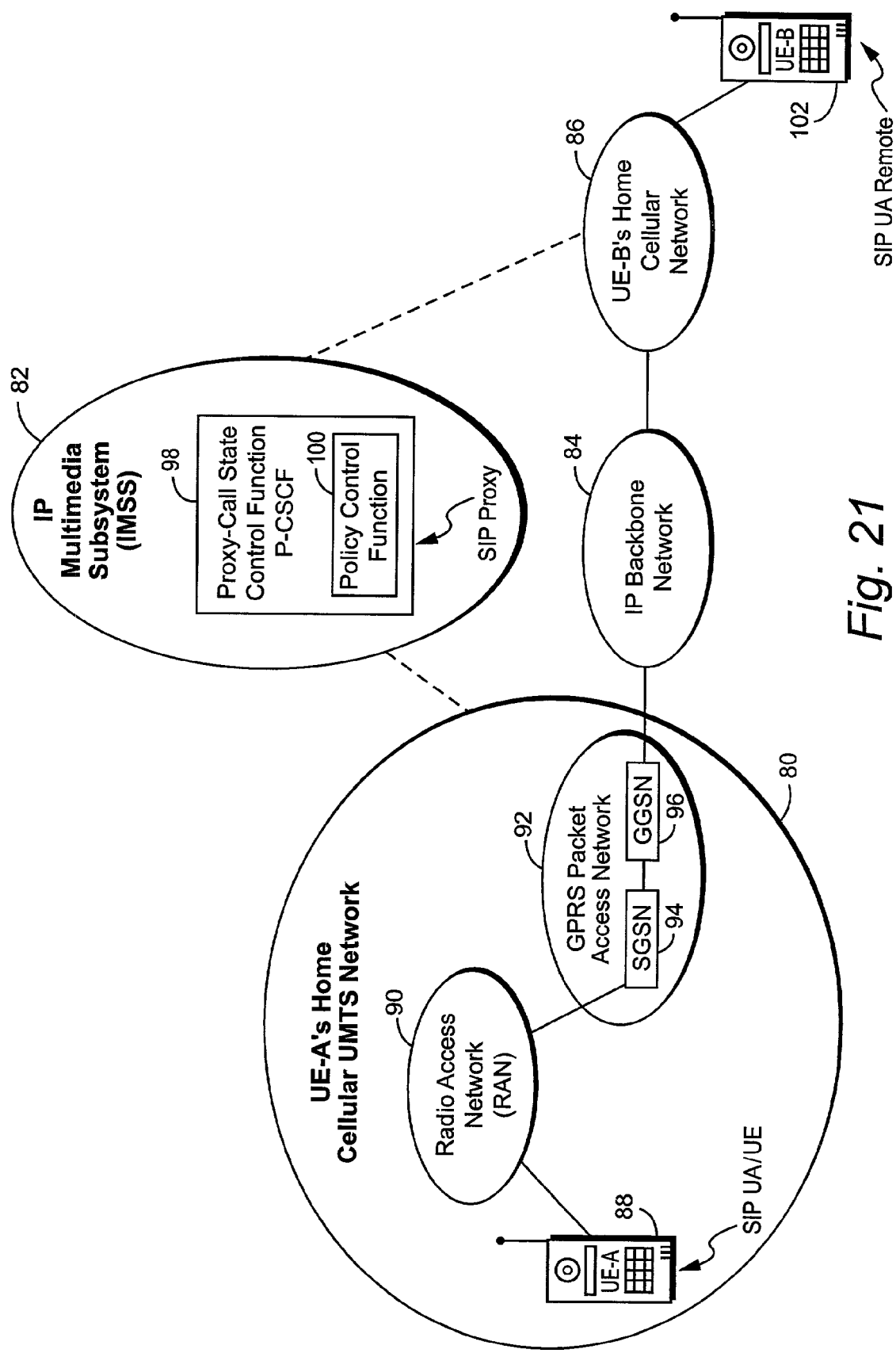
FIG. 21 illustrates a GPRS/UMTS-based communication system for conducting multimedia sessions in accordance with another example embodiment of the present invention.

The present invention has particularly advantageous application to multimedia sessions involving a GPRS/UMTS network. Of course, the present invention is not limited to this particular application or to the preferred example embodiment now described. Reference is made to the communications system shown in FIG. 21 that includes a RAN 90 coupled to a GPRS Packet Access Network 92 in a GPRS/UMTS-type network 80 which is coupled to an IP multimedia subsystem (IMSS) 82. Communication with the IMSS 82 (shown as dashed lines) permits exchange of multimedia session control related messages. The GPRS/UMTS-type network 80 is also coupled to an IP backbone network 84. This coupling (shown as a solid line) is used to transport user data IP packets. The IMSS 82 is typically a part of (although it may be separate from and coupled to) an IP backbone network 84. The remote host corresponding to user equipment (UE-B) 102 is coupled to the IP backbone network 84 through its home cellular network 86, and by signaling connection, to the IMSS 82.

In this example, the mobile terminal 88 corresponding to UE-A 88 desires to establish a multimedia session with UE-B 102. The packet traffic for this session follows the solid line couplings between the various nodes. The session is established and managed using Session Initiation Protocol (SIP), and therefore, the user equipments 88 and 102 correspond to SIP User Agents (SIP UA). UE-A 88 is coupled via the Radio Access Network (RAN) 90 to the GPRS packet access network 92. As described earlier, the GPRS network 92 includes one or more SGSNs 94 coupled to one or more GGSNs 96. The IP multimedia system 82 includes a Call State Control Function, in this example a proxy-CSCF (P-CSCF) 98 is shown, and a Policy Control Function (PCF) 100. P-CSCF 98 and PCF 100 may be implemented on the same or different servers. The Proxy-Call State Control Function 98 functions as a SIP proxy for the SIP user agent UE-A 88.

Figure 22:
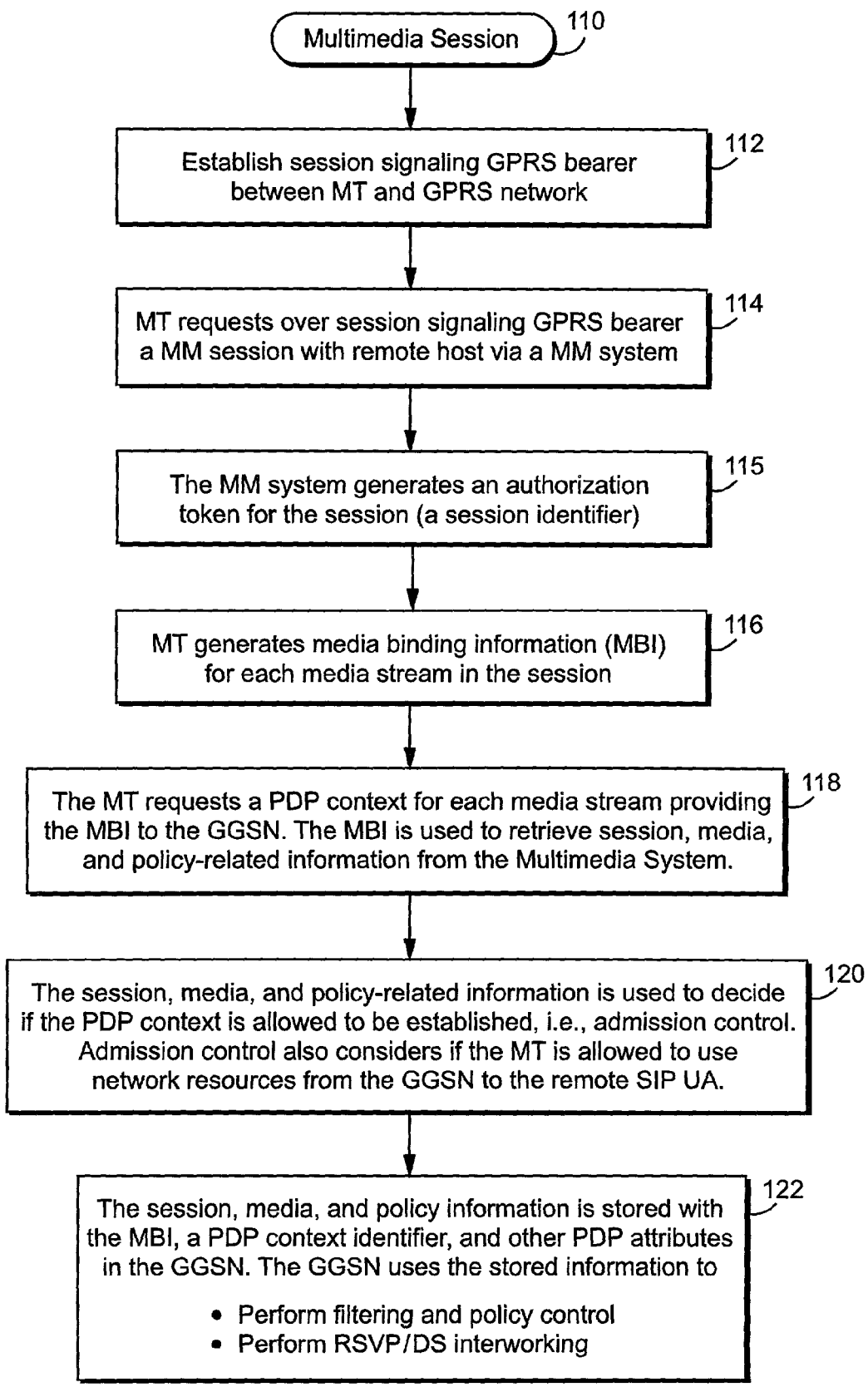
FIG. 22 is a flowchart illustrating example procedures for establishing a multimedia session in the system shown in FIG. 21.

Reference is now made to the Multimedia Session routine (block 110) in FIG. 22 which outlines in flowchart form example procedures for establishing a multimedia session between UE-A and UE-B. A session signaling GPRS bearer is established between UE-A and the GPRS network 92 using well-established GPRS PDP context activation messages. This session signaling GPRS bearer corresponds to a first PDP context signaling (block 112). UE-A requests a multimedia session with the SIP UA remote UE-B over the session signaling GPRS bearer via the RAN 90, the GPRS network 92, the IP multimedia subsystem 82, the IP backbone network 84, and UE-B's home cellular network 86 (block 114). This request may be in the form of an SIP/SDP message which contains sufficient information about the session, such as the source (UE-A) and destination (UE-B) end points, bandwidth is requirements, and the characteristics of the media exchange, etc. to trigger an authorization of QoS resources procedure in the Proxy-Call State Control Function 98. The Policy Control Function 100 authorizes, if appropriate, the required quality of service resources for the session and installs an IP bearer level policy for the session and each media flow based on the information from the Proxy-Call State Control Function 98. In addition, the Policy Control Function 100 generates an authorization "token" for the session (session identifier) and sends it to UE-A and UE-B (block 115). The multimedia session is authorized, and the policy control function 100 stores session information for each of the media flows in the session.

In this example, the mobile terminal generates media binding information (MBI) for each media data stream in the session (block 116). The mobile terminal requests a PDP context for each media stream and also provides the MBI to the GGSN in the PDP context request message. The MBI is used to retrieve session, media, and policy related information from the multimedia system (block 118). One MBI may be included per PDP context, or multiple MBIs may be included per PDP context. The MBI may also be used in a PDP context modification message. Because a first PDP context activation message was initially generated to set up the session control signaling GPRS bearer from the mobile terminal UE-A to the GGSN, the PDP context request in block 118 is called a "secondary" PDP context request. The session, media, and policy related information is used to decide if the PDP context is allowed to be established (admission control). The admission control also considers if the mobile terminal is allowed to use network resources from the GGSN to the remote SIP UA (block 120).

The media binding information associates the PDP context bearer with the policy information for that media stream. In a preferred example embodiment, the PDP configuration options parameter present in the existing GPRS PDP context activation/modification message format may be used to carry the media binding information for each PDP context corresponding to one of the media flows. The media binding information includes sufficient information to identify its corresponding media flow and GPRS bearer as well as the session. The media binding information is used by the UE-A, GGSN 96, and the PCF 100 to uniquely identify, monitor, and control the IP media flows and bearers from the session level.

The media binding information (MBI) for each of the media data streams is included in the corresponding secondary PDP context request using well-established GPRS-PDP context messaging signals. Again, it is possible to include one MBI per PDP context, or multiple MBIs per PDP context. The GGSN uses the MBIs to pull policy decisions from the PCF. More specifically, the session, media, and policy related information is stored together with the MBI, PDP context identifier, and other PDP context attributes in the GGSN. Based on that stored information and the policy decisions pulled from the PCF, the GGSN performs filtering, policy control, and RSVP/DS interworking (block 122).

Policy control allows the network operator to control the authorization and usage of GPRS bearers based on the session attributes. For example, the network operator may apply policies such as:

Authorizing a particular type of GPRS bearer (a high bandwidth real time GPRS bearer), only for a media stream with relevant characteristics (e.g., a high quality video conference)
 Restricting the bandwidth of the PDP context dependent on a selected codec signaled to be used in the session
 Blocking and enabling transmission of the media stream based on the state of the SIP Session, blocking the GPRS bearer before a session thru state, i.e., not enabling the GPRS bearer until the session thru message has passed the P-CSCF.

The media binding information may be communicated in any appropriate format. One example way is to include the media binding information in the SDP portion of the SIP message as part of the media definition. This approach has the advantage that each media stream description explicitly carries its own token information.

Another example method is to generate a token by using a base token corresponding to the session identified or authorization token and combine it with media stream-specific parameters to generate the MBI to explicitly identify the individual media stream. The base token is generated and distributed with the SIP signaling, i.e., the session authorization token. A media stream identifier is then generated by the SIP user agent/UE and other session level entities like the PCSCF/PCF to generate a media stream identifier using a predetermined algorithm or procedure. Because both entities use the same procedure, both generate the same media stream identifier for each media stream. The complete media binding information is the combination of the session token and the media stream identifier.

The media stream identifier may be formed by its position in the SDP messages, for example, by assigning a consecutive number to the media streams in the SDP message. All new media streams may be identified in increasing order when processing the SDP message with the number series being started for each new SIP session at a predetermined starting point, e.g., "0" or "1." Separate counters may be used for originating and terminating SIP sessions. As a media stream is added or deleted from a session, the new stream is provided the next number in the series, and numbers are not reallocated. Additional information, such as port number and protocol, may be used to verify the media stream identifier, e.g., a simple counter plus a hash function of that additional information.

In the first example method where the MBI is to be sent in the SDP as part of the media definition, the MBI may be generated locally in each domain at the UE and the P-CSCF or the PCF. In other words, the MBI is included in the SDP and used locally between the P-CSCF and the UE in that domain. In this case, the local MBI is not sent end-to-end. Alternatively, a global MBI could be generated for each media stream and used at both ends of the network, i.e., in the domains of both UE-A and UE-B. However, this requires coordination to ensure that the MBIs do not collide. Irrespective of whether the basic session identifier/authentication token is generated locally or remotely, the procedures to extend the session identifier/authentication token to include a media stream identification to generate the media binding information (MBI) are the same.

Consider the following example. The SIP INVITE message used to set up a multimedia session includes SDP that describes the media for the session. A typical SDP has the following format where the values given represent only an example:
    v=0
    c=IN IP4 110.111.112.113
    t=3034423619
    0=user B 2890844527 2899088422 IN IP 4 client.there-.com
    s=Session SDP
    m=audio 3456 RTP/AVP 0
    a=RTP map :0 PCMU/8000

The SDP may be extended with a media authorization token or ID for every media description and could take the form:
    k=media-authorization token In the second method, the session identifier/authorization token is distributed to SIP level entities. For each media stream, a media stream identifier is generated and combined with the session identifier/authorization token at the mobile terminal and other SIP level entities, e.g., the PCF, to provide the media binding information for each media stream. For example, consider an SDP description like that used above but extended to contain multiple media:
    v=0
    c=IN IP4 110.111.112.113
    t=3034423619
    0=user B 2890844527 2899088422 IN IP 4 client.there-.com
    s=Session SDP
    m=audio 3456 RTP/AVP 0
    a=RTP map :0 PCMU/8000
    m=video 51372 RTP/AVP 31
    a=RTP map: 31 X-GSMLPC/8,000
    m=application 32 416 UDP WB Each of the "m=" lines in the example above denotes a media stream.

An INVITE message is shown below using the SDP description from above with multiple media steams included ("m=" lines).
    INVITE sip:watson@boston.bell-tel.com SIP/2.0
    Via: SIP/2.0/UDP kton.bell-tel.com
    From: A. Bell<sip:a.g.bell@bell-tel.com>;tag=3
    To: T. Watson<sip:watson@bell-tel.com>
    Call-ID: 662606876@kton.bell-tel.com
    Cseq: 1 INVITE
    Contact:<sip:a.g.bell@kton.bell-tel.com>
    Content-Type: application/sdp
    Content-Length: . . .
    v=0
    o=bell 53655765 2353687637 IN IP4 128.3.4.5
    t=3149328600 0
    c=IN IP4 kton.bell-tel.com
    m=audio 3456 RTP/AVP 0
    a=rtpmap :0 PCMU/8000
    m=video 51372 RTP/AVP 31
    a=rtpmap:31 X-GSMLPC/8000
    m=application 32416 udp wb A 183 Session Progress message is shown below as a response to the initial INVITE message. This response from the remote host indicates a willingness to exchange the three media streams offered by the session originator (three "m=" lines are included with the same media format as those offered by the originator, but the port numbers are replaced with those relevant for the terminating side). A session identifier/authorization token generated by the network is included with SIP and is indicated by "Media-Authorization."
    SIP/2.0 183 Session Progress
    Via: SIP/2.0/UDP kton.bell-tel.com
    From: A. Bell\<sip:a.g.bell@bell-tel.com>;tag=3
    To: <sip:watson@bell-tel.com>;tag=37462311
    Call-ID: 662606876@kton.bell-tel.com
    Cseq: 1 INVITE
    Contact: sip:watson@boston.bell-tel.com
    Media-Authorization: 1b41723
    Content-Type: application/sdp
    Content-Length: . . .
    v=0
    o=watson 4858949 4858949 IN IP4 192.1.2.3
    t=3149329600 0
    c=IN IP4 boston.bell-tel.com
    m=audio 48112 RTP/AVP 0
    a=rtpmap:0 PCMU/8000
    m=video 3176 RPT/AVP 31
    a=retmap:31 X-GSMLPC/8000
    m=application 51473 udp wb The session identifier/authorization token provided above in the SIP signaling can be viewed as the "base" token. This session identifier/authorization token is extended by adding a media flow identifier to create the media binding information using a predetermined algorithm or procedure. For example, one possible algorithm would be to simply number the "m=" lines of the media streams in increasing order, e.g., the line "m=audio 48112 RTP/AVP 0" would be 1, the line "m=video 3176 RPT/AVP 31" would be 2, and the line "m=application 51473 udp wb" would be 3.

Figure 23:
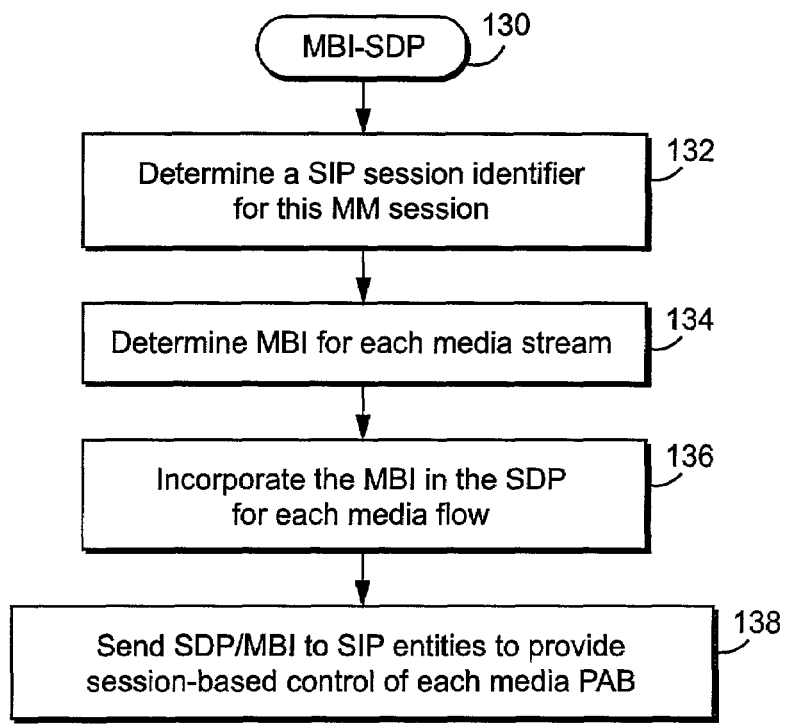
FIG. 23 illustrates in flowchart form procedures for generating media binding information in the SDP SIP signaling.

Example procedures for providing the media binding information in accordance with a first, non-limiting, example embodiment of the present invention is described now in conjunction with an MBI-SDP routine (block 130) shown in flowchart form in FIG. 23. A SIP session identifier (sometimes called an authorization token) is determined for the multimedia session, (e.g., generated at the PCF and stored at the P-CSCF) (block 132). In addition, media binding information is determined for each media data stream in the session (block 134). The media binding information is included in the SDP for each media flow in the multimedia session, e.g., as an SDP extension (block 136). The SDP/MBI is provided to each session level/SIP entity and used by that entity to perform session-based functions for and/or control of each media packet access bearer supporting a media flow in the session (block 138).

Figure 24:
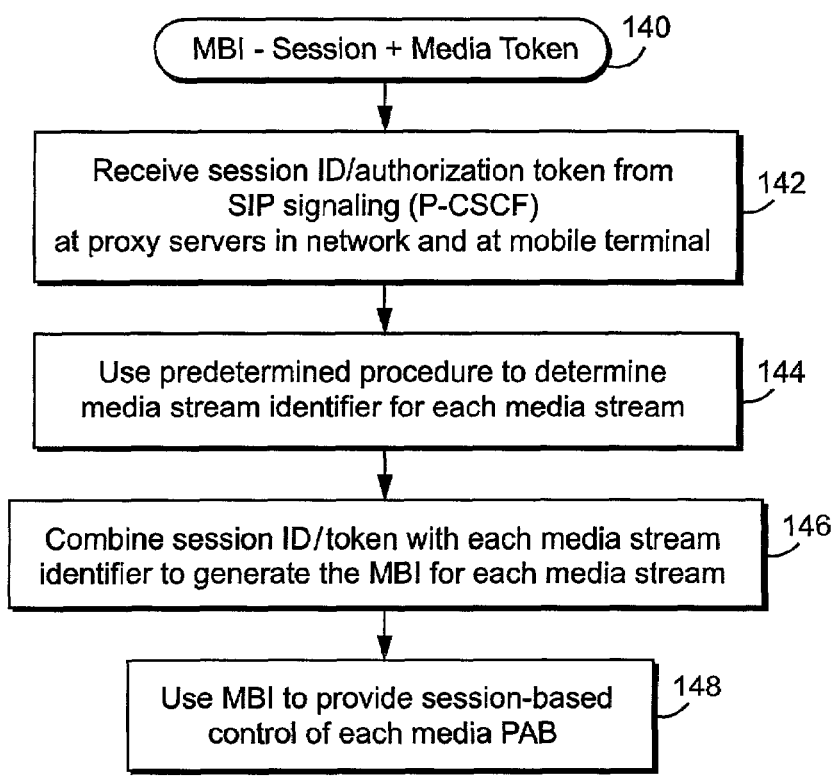
FIG. 24 generating media binding information by combining session and media tokens.

Another example, non-limiting embodiment for providing the media binding information is now described in conjunction with the MBI-Session+Media Token routine (block 140) illustrated in flowchart form in FIG. 24. A session ID/authorization token is received from SIP signaling, (e.g., generated at the PCF and stored at the P-CSCF), at session level/SIP entities in the network and at the mobile terminal (block 142). A predetermined procedure is used at the mobile terminal and at the session level/SIP entities to determine the media stream identifier for each media stream in the session (block 144). The session ID/authorization token is combined with each media stream identifier by the mobile terminal and the Ho.; session level/SIP entities to generate the MBI for each media stream (block 146). The media binding information is used to provide session-based functions for and/or control of each media packet access bearer supporting a media flow in the session (block 148).

Figure 25:
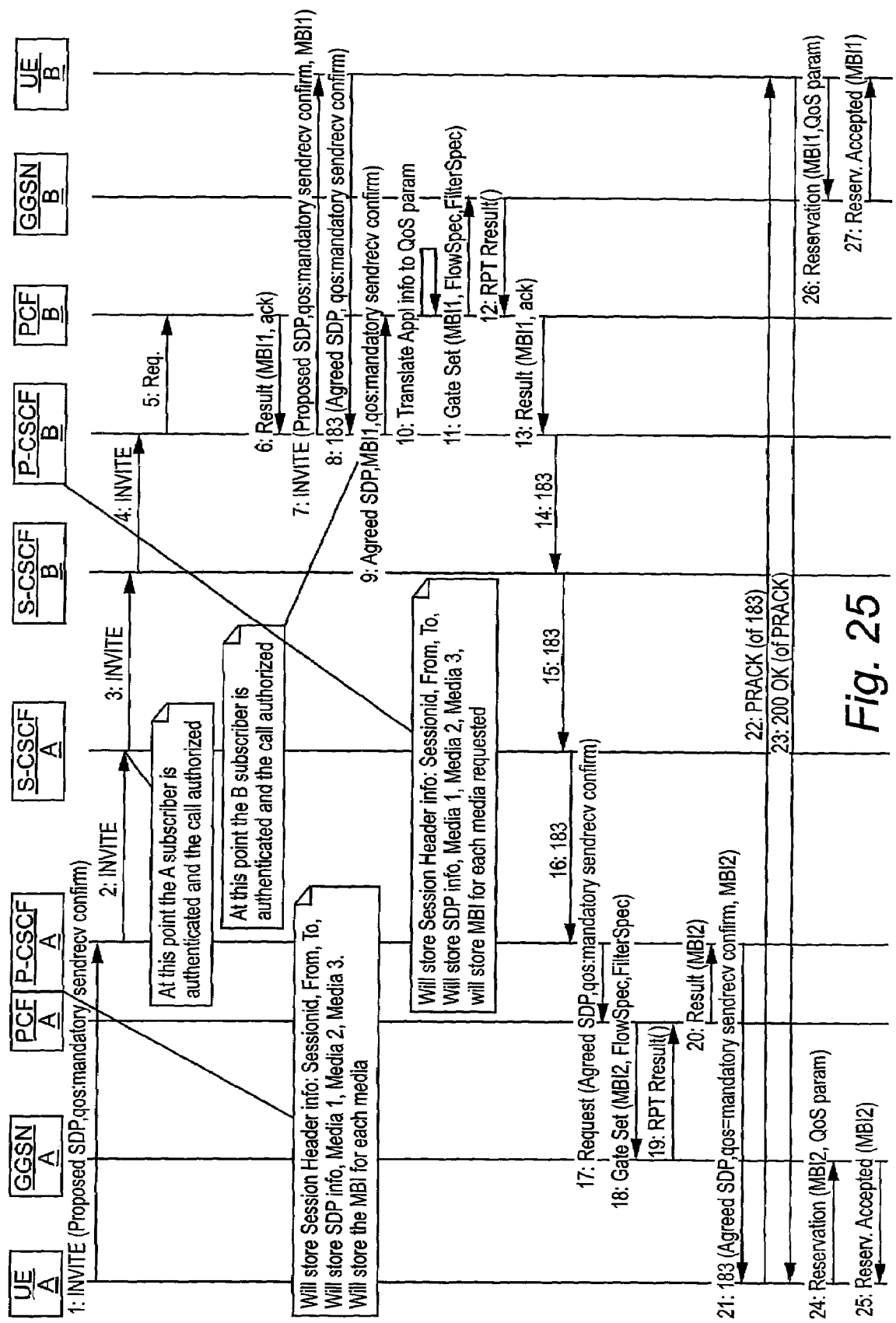
FIG. 25 is a signaling diagram illustrating various signals for establishing a multimedia session and providing media binding information in accordance with one example non-limiting embodiment of the present invention as applied to the system shown in FIG. 21.

An example signaling flow diagram for an example multimedia session between UE-A and UE-B using the first method for providing the media binding information in the SDP of a multimedia session setup is shown in FIG. 25 and now described. Although not shown, the UE initially establishes a first PDP context with the GGSN to establish a GPRS bearer for session signaling needed to establish the multimedia session. The UE-A then registers with the proxy-CSCF before sending a SIP INVITE message on the GPRS signaling bearer to the CSCF to setup the IP multimedia session.

Figure 26:
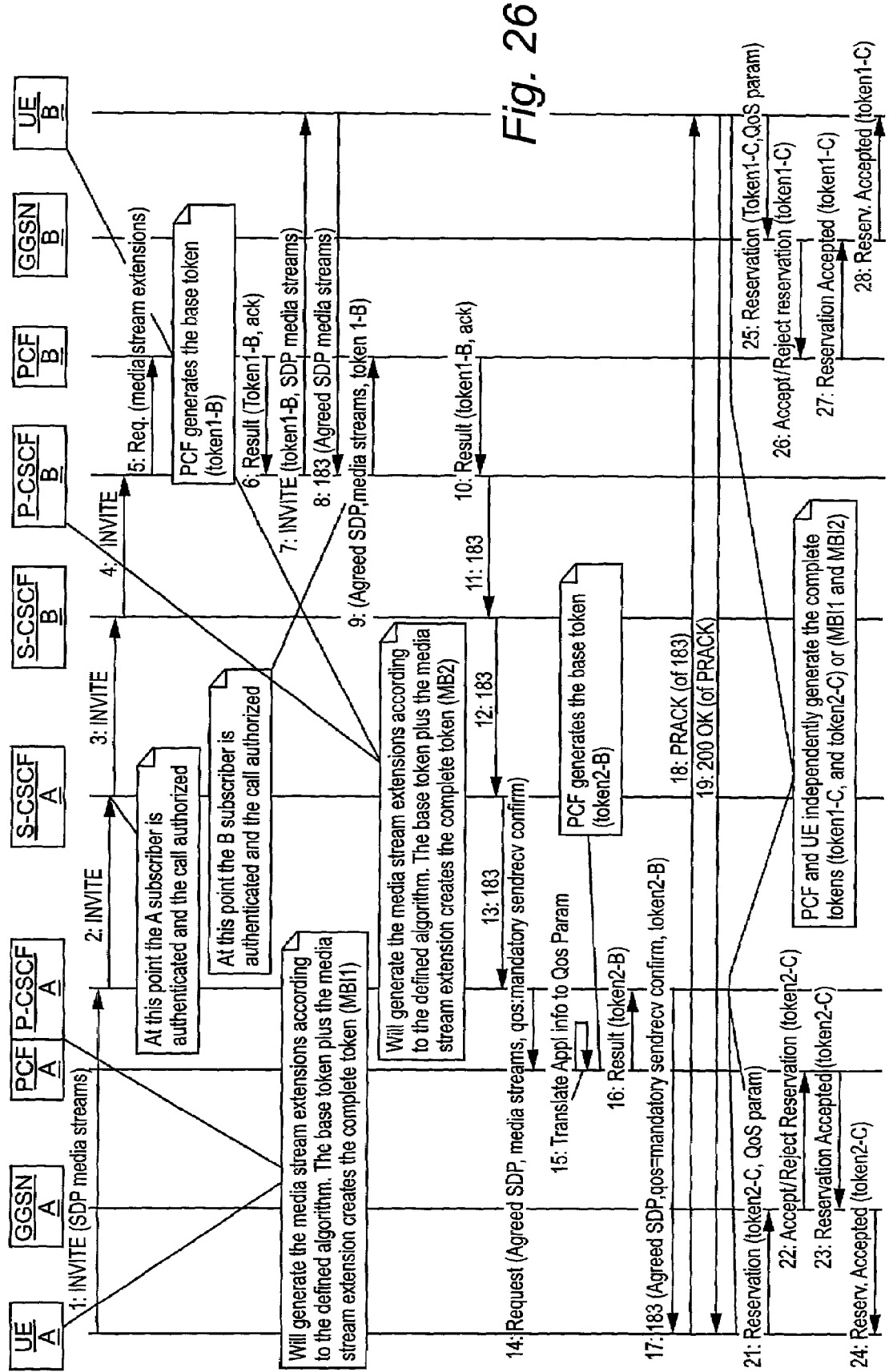
FIG. 26 is a signaling diagram illustrating various signals for establishing a multimedia session and generating media binding information in accordance with another example non-limiting embodiment of the present invention as applied to the system shown in FIG. 21.

The signaling diagrams in FIGS. 25 and 26 illustrate two domains or sides: the A side and the B side. Each side includes corresponding user equipment, GGSN, PCF, proxy-CSCF, and serving-CSCF entities. The UE-A initiates the multimedia session with an INVITE command which is sent over a session signaling bearer to the GGSN and forwarded by the GGSN to the multimedia system A. The INVITE message includes session details such as the number of media flows and requested corresponding quality of service as well as other information. The proxy-CSCF-A receives the INVITE command and stores session header information including a session ID and source/destination addresses along with SDP information relating to each of the medias being requested for the session.

The proxy-CSCF-A forwards the INVITE message to UE-A's serving-CSCF-A which authenticates UE-A and authorizes the multimedia call. The INVITE message is then forwarded to the B side through UE-B's serving-CSCF-B to UE-B's proxy-CSCF-B which stores the SIP session header information and the SDP information. The proxy-CSCF-B sends a request to PCF-B for media binding information for each of the media streams identified in the SDP of the INVITE for the multimedia session. The PCF-B returns a local MBI-1 along with an acknowledgment for each media stream. The MBI-1 information for each media stream is used locally in the B-side only. However, global MBI information could be employed by both A and B sides as described earlier.

The proxy-CSCF-B forwards the INVITE message incorporating the MBI-1 information in the INVITE SDP, e.g., as an SDP extension. UE-B evaluates the INVITE and sends a SIP 183 message indicating UE-B's agreement to the multimedia session and the accompanying session parameters, e.g., the requested media streams. The 183 message information is sent along with the MBI-1 information to the PCF-B which translates the requested quality of service at the application level for each requested media stream to quality of service parameters at the GPRS bearer level. It is during this process that the appropriate admission control and policy enforcement rules are established and provided to an IP "Gate Keeper" GGSN-B for this session at signal 11 labeled as "Gate Set." At this point, appropriate flow specifications and filter specifications are provided together with the MBI-1 for each media flow to the GGSN-B. The GGSN-B sends a Report Result acknowledging the Gate Set command to the PCF-B, which forwards the acknowledgment and the MBI-1 information to the proxy-CSCF-B.

The proxy-CSCF-B forwards the SIP 183 message back to the proxy-CSCF-A which issues a similar request to PCF-A, which issues local media binding information-2 (MBI-2) for each media stream in the session, (i.e., local to side A), along with appropriate admission and policy control information to the GGSN-A gate in a "Gate Set" command labeled as signal 18. The GGSN-A sends its report back, and the PCF-A sends the Request Result back along with the MBI-2 information. The proxy-CSCF-A then forwards the 183 message along with the MBI-2 information to the UE-A. The PRACK of the 183 message and the responding 200 OK SIP message acknowledge the 183 message and indicate that the multimedia session setup should proceed. Consequently, the UE-A sends a reservation message to the GGSN-A with the media binding information MBI-2 and the requested quality of service parameters at the GPRS bearer level so that appropriate GPRS and external IP resources to support the media QoS can be reserved. When those resources are reserved for each of the GPRS packet access bearers corresponding to the media stream, a reservation accepted message is sent back to UE-A along with the MBI-2 information. Similar reservation and acceptance procedures are performed between UE-B and GGSN-B using the MBI 1 information.

FIG. 26 illustrates a signaling diagram similar to that shown in FIG. 25 illustrating one example signaling for implementing the present invention in accordance with the second example method for providing media binding information. Most of the signals shown in FIG. 26 are similar to those described in FIG. 25. Accordingly, the following is a description of the differences in the signaling to implement the second example method for generating media binding information.

In the Request message 5 to the PCF-B, the PCF-B generates a local (to side B) base token (session identifier/authorization token) token-1-B and provides it in the acknowledgment to the request. The INVITE message is forwarded with token-1-B and the proposed SDP media stream definitions to UE-B from the proxy-CSCF-B. Token-1-B only identifies the multimedia session on the B side and does not individually identify each of the media streams. At reception of signal 9, after authenticating the B subscriber and authorizing the multimedia call, the PCF-B returns a Result message to the proxy-CSCF-B along with token-1-B. The proxy-CSCF-B forwards the SIP 183 message to the proxy-CSCF-A which forwards a request to the PCF-A. The PCF-A translates the agreed upon media stream information into IP-level quality of service parameters. At the same time, PCF-A generates a base token corresponding to a local (to side A) session identifier/ authorization token, base token-2-B, and returns it to the proxy-CSCF-A. The SIP183 message is then forwarded to the UE-A along with the base token-2-B.

After the PRACK messaging is exchanged between the UE-A and UE-B, UE-A, PCF-A, PCF-B, and UE-B each independently generate a complete local token "C" corresponding to the media binding information. This is done by combining their respective local base token (token-1-B and token-2-B) and combining it with a media stream identifier for each media stream to generate a complete local token (token-1-C and token-2-C) which correspond to media binding information-1 and media binding information-2. The complete local tokens are employed in the GPRS quality of service reservation procedures (PDP context activation/creation) shown in signals 21-28 binding the media streams to their corresponding GPRS bearers.

Thus, irrespective of the quality of service mechanism used by the external packet data network, the media binding information may be used to enhance interworking options/functionality at the GGSN, for example, to obtain the necessary parameters for RSVP signaling, which it does not receive in the PDP context signaling, and thus provide interworking to RSVP enabled domains. Other examples of enhanced interworking using the MBI include performing more complex admission control decisions by obtaining, for example, the destination address, providing access to resources reserved for traffic accessing a specific IP multimedia service by obtaining multimedia session-related event triggers, using the obtained destination address to select an external packet data network quality of service mechanism or interface, and applying additional traffic controls for the bearer, (e.g., restrictive source/destination address and port numbers), etc.

The media binding information in accordance with the present invention enables control of multiple GPRS bearers corresponding to multiple multimedia data streams from the session level. Without the media binding information to identify the GPRS bearer associated with the corresponding media stream, such session level control is quite limited because current multimedia session signaling parameters only provide a means to control one bearer or all the bearers associated with the session as a group. By binding the session level media streams to the supporting GPRS bearers, the present invention ensures control of the end-to-end QoS for multimedia calls and enhanced interworking between GPRS/UMTS and other networks.

The present invention provides different mechanisms to control the media GPRS bearers individually on a per media stream basis. The first example method for providing media binding information only requires a simple change for in how the session token is defined and can be readily implemented in the SDP of the SIP session signaling. The other example method uses an extension from a base token to a complete token, and this extension need only be performed in the SIP agents including the user agent in the mobile terminal and various servers in the network, e.g., the PCF, the P-CSCF, or other node if desired. These methods are also advantageous because none extend the session level signaling or the bearer level signaling with additional messages or additional signaling protocols/procedures. Extended control of QoS or interworking at the bearer level may therefore be performed without loading the terminal-to-network interface with exchange of additional messages. This is particularly useful when the terminal accesses the network over a radio interface because scarce radio resources are saved.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for setting up a multimedia session involving a mobile terminal, comprising:
   using session signaling, initiating a multimedia session with plural media data streams between the mobile terminal and a remote host coupled to a packet data network, the mobile terminal being coupled to the packet data network and to a multimedia system that provides multimedia session services by way of an access point;
   establishing a plurality of media packet access bearers to transport corresponding ones of the media data streams between the mobile terminal and the access point;
   creating media binding information for each media data stream; and
   using the media binding information to associate each media data stream in the session to one of the media packet access bearers to provide session-based control of each of the media packet access bearers,
   wherein the media binding information corresponding to one of the media data streams identifies the multimedia session and the one media data stream, and
   wherein if a parameter of one of the media data streams changes, the corresponding media binding identifier changes.

2. The method in claim 1, wherein multiple media data streams share a same media packet access bearer and multiple media binding information elements are associated with the shared media packet bearer.

3. The method in claim 1, wherein local media binding information is generated for each media data stream for use in a local domain of the mobile terminal and local media binding information is generated for each media data stream for use in a local domain of the remote host.

4. The method in claim 1, wherein the media binding information generated for each media data stream is used in a local domain of the mobile terminal and in a local domain of the remote host.

5. The method in claim 1, wherein the media binding information is included in a message portion of the session signaling included with the media definition.

6. The method in claim 5, wherein the session signaling is based on Session Initiation Protocol (SIP) and the message portion is Session Description Protocol (SDP), and wherein the media binding information is included in the SDP for the multimedia session.

7. The method in claim 6, wherein the media binding information is an SDP extension.

8. A method for use in setting up a multimedia session between a mobile terminal and a remote host, comprising:
   using session signaling, initiating a multimedia session with plural media data streams between the mobile terminal and a remote host coupled to a packet data network, the mobile terminal being coupled to the packet data network and to a multimedia system that provides multimedia session services by way of General Packet Radio Service (GPRS) network;

receiving media binding information for each of the plurality of media data streams as a part of the session signaling;

requesting a GPRS bearer for each media data stream and associating the corresponding media binding information to each GPRS bearer;

transporting the media data streams using corresponding ones of the GPRS bearers; and providing session-based control of each of the GPRS bearers using the media binding information, wherein the media binding information corresponding to one of the media data streams identifies the multimedia session and the one media data stream, and wherein if a parameter of one of the media data streams changes, the corresponding media binding identifier changes.

9. The method in claim 8, wherein local media binding information is generated for each media data stream for use in a local domain of the mobile terminal and local media binding information is generated for each media data stream for use in a local domain of the remote host.

10. The method in claim 8, wherein the media binding information generated for each media data stream is used in a local domain of the mobile terminal and in a local domain of the remote host.

11. The method in claim 8, wherein the session signaling is session initiation protocol (SIP) signaling and the message portion is Session Description Protocol (SDP), and wherein the media binding information is included in the SDP for the multimedia session.

12. The method in claim 11, wherein the media binding information is included in the SDP as an SDP extension.

13. The method in claim 8, wherein multiple media data streams share a same media packet access bearer and multiple media binding information elements are associated with the shared media packet bearer.

14. For use in setting up a multimedia session between the mobile terminal and a remote host using session signaling, where the multimedia session includes plural media data streams, the mobile terminal being coupled to packet data network and to a multimedia system that provides multimedia session services by way of an access point, a multimedia service controller comprising:

electronic circuitry configured to provide to at least one of the mobile terminal and the access point media binding information that individually identifies each media data stream, wherein the media binding information is used to associate each media data stream in the session to one of plural media packet access bearers established to transport corresponding ones of the media data streams between the mobile terminal and the access point thereby permitting session-based control of each of the media packet access bearers, wherein the media binding information corresponding to one of the media data streams identifies the multimedia session and the one media data stream, and wherein if a parameter of one of the media data streams changes, the corresponding media binding identifier changes.

15. The multimedia service controller in claim 14, wherein the multimedia service controller is a session controller.

16. The multimedia service controller in claim 14, wherein the multimedia service controller is a policy controller.

17. The multimedia service controller in claim 14, wherein the media binding information identifies the multimedia session and a corresponding one of the media data streams.

18. The multimedia service controller in claim 14, wherein the session signaling is session initiation protocol (SIP) carrying a signaling message corresponding to Session Description Protocol (SDP), and wherein the electronic circuitry is configured to include the media binding information in the SDP for the multimedia session.

19. The multimedia service controller in claim 18, wherein the media binding information is an SDP extension.

20. For use in setting up a multimedia session between the mobile terminal and a remote host using session signaling, where the multimedia session includes plural media data streams, the mobile terminal being coupled to packet data network and to a multimedia system that provides multimedia session services by way of an access point, the mobile terminal comprising electronic circuitry configured to perform the following tasks:

initiate the multimedia session using session signaling so that a plurality of media packet access bearers can be established to transport corresponding ones of the media data streams between the mobile terminal and the access point;

create media binding information for each media data stream; and use the media binding information to associate each media data stream in the session to one of the media packet access bearers, wherein the media binding information corresponding to one of the media data streams identifies the multimedia session and the one media data stream, and wherein if a parameter of one of the media data streams changes, the corresponding media binding identifier changes.

21. The mobile terminal in claim 20, wherein the session signaling is session initiation protocol (SIP) carrying a signaling message corresponding to Session Description Protocol (SDP), and wherein the electronic circuitry is configured to determine the media binding information in the SDP for the multimedia session.

22. The mobile terminal in claim 21, wherein the media binding information is an SDP extension.

* * * * *

UNITED STATES PATENT AND TRADEMARK OFFICE
CERTIFICATE OF CORRECTION

PATENT NO.         : 7,546,376 B2                                       Page 1 of 1
APPLICATION NO.    : 09/985573
DATED              : June 9, 2009
INVENTOR(S)        : Widegren et al.

It is certified that error appears in the above-identified patent and that said Letters Patent is hereby corrected as shown below:

In Column 2, Line 20, after "102" delete "o".

In Column 4, Line 27, after "are" delete "No".

In Column 4, Lines 37-38, delete "RSVPenable" and insert -- RSVP-enable --, therefor.

In Column 4, Line 59, after "network" delete "As".

In Column 5, Line 61, delete "to each" and insert -- each --, therefor.

In Column 8, Line 54, delete "Response"0" and insert -- Response" --, therefor.

In Column 15, Line 47, delete "is" before "requirements,".

In Column 16, Line 65, delete "PCSCF/PCF" and insert -- P-CSCF/PCF --, therefor.

In Column 19, Line 24, after "and the" delete "Ho.;".

Signed and Sealed this

Twenty-fourth Day of November, 2009

David J. Kappos
*Director of the United States Patent and Trademark Office*